(12) United States Patent
Mishina et al.

(10) Patent No.: US 8,769,700 B2
(45) Date of Patent: *Jul. 1, 2014

(54) METHOD, APPARATUS AND COMPUTER PROGRAM FOR SUPPORTING DETERMINATION ON DEGREE OF CONFIDENTIALITY OF DOCUMENT

(75) Inventors: Takuya Mishina, Kanagawa (JP); Masayoshi Teraguchi, Kanagawa (JP); Sachiko Yoshihama, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/603,486

(22) Filed: Sep. 5, 2012

(65) Prior Publication Data

US 2012/0331562 A1  Dec. 27, 2012

Related U.S. Application Data

(63) Continuation of application No. 12/709,878, filed on Feb. 22, 2010, now Pat. No. 8,307,451.

(30) Foreign Application Priority Data

Feb. 24, 2009 (JP) .................................. 2009-40339

(51) Int. Cl.
  *G06F 7/04*  (2006.01)
  *G06F 21/10*  (2013.01)
  *G06F 17/30*  (2006.01)
  *H04N 7/16*  (2011.01)

(52) U.S. Cl.
  CPC .................................... *G06F 21/10* (2013.01)
  USPC ................. 726/26; 726/12; 726/30; 709/201; 713/193

(58) Field of Classification Search
  None
  See application file for complete search history.

(56) References Cited

U.S. PATENT DOCUMENTS

| | | | | |
|---|---|---|---|---|
| 7,152,244 B2 * | 12/2006 | Toomey | ........................ | 726/26 |
| 7,546,334 B2 * | 6/2009 | Redlich et al. | ................ | 709/201 |
| 7,594,277 B2 * | 9/2009 | Zhang et al. | ..................... | 726/30 |
| 7,996,892 B2 * | 8/2011 | Pomerantz | ..................... | 726/12 |
| 7,996,910 B2 * | 8/2011 | Toomey | ........................ | 726/26 |
| 8,046,592 B2 * | 10/2011 | Crane et al. | ................... | 713/193 |
| 8,077,867 B2 * | 12/2011 | Nemoto et al. | ................. | 380/42 |

FOREIGN PATENT DOCUMENTS

| | | |
|---|---|---|
| JP | 2005201932 | 7/2005 |
| JP | 2007-048236 | 2/2007 |
| JP | 2007-081955 | 3/2007 |
| JP | 2007-148921 | 6/2007 |

* cited by examiner

*Primary Examiner* — Shin-Hon Chen
(74) *Attorney, Agent, or Firm* — Vazken Alexanian

(57) ABSTRACT

Determining confidentiality of an office document shared by multiple organizations. Each block of a document data set is stored in association with confidentiality information indicating whether the block is confidential. The document data set is dividable into blocks each being a unit including properties evaluated as having a certain characteristic. A document data set targeted for the confidentiality determination is acquired, and it is determined whether a document data set, including a block similar to each block of the acquired document data set, is stored. If the document data set including the similar block is stored, it is determined whether the confidentiality information indicating that the block is confidential is assigned to the block of the acquired document data corresponding to the similar block. If the confidentiality information indicating that the block is confidential is assigned, the acquired document data set is determined as confidential.

7 Claims, 16 Drawing Sheets

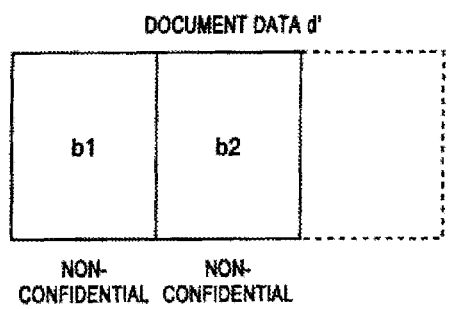 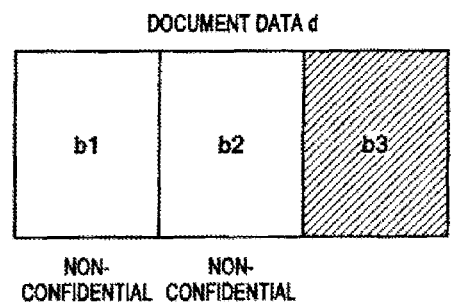
FIG. 6
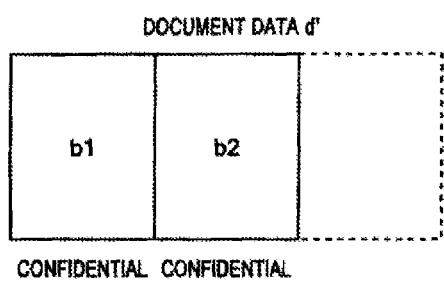 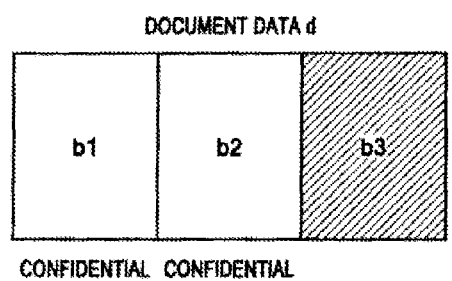
FIG. 7
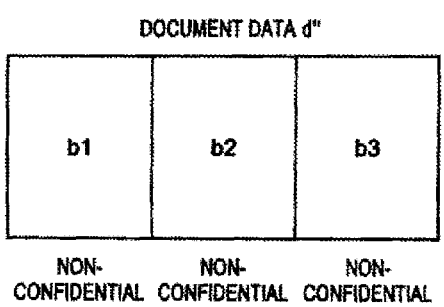 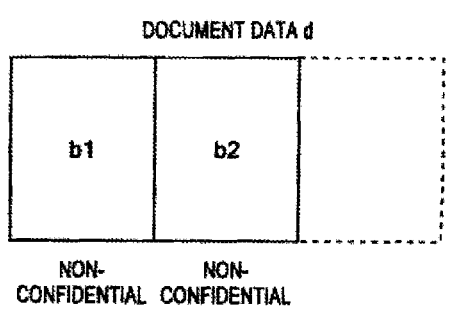
FIG. 8

(a)  D1 = "IBM will release a new product Hogehoge in September 2008"
     D2 = "IBM release a new product XXXXX XXXXX XXXXX"

(b) CHARACTERISTIC INFORMATION c (x)

|       | IBM | release | product | Hogehoge | September | 2008 | XXXXX |
|-------|-----|---------|---------|----------|-----------|------|-------|
| c(D1) | 1   | 1       | 1       | 1        | 1         | 1    | 0     |
| c(D2) | 1   | 1       | 1       | 0        | 0         | 0    | 3     |

FIG. 16 c(D1) - c(D2)

|              | Hogehoge | September | 2008 |
|--------------|----------|-----------|------|
| c(D1) - c(D2)| 1        | 1         | 1    |

FIG. 17

(a) Dp(CONFIDENTIAL) = "IBM will release a new product Hogehoge in September 2008. The product mitigates risks of Enterprise information leakage"

(b) Dq(NON-CONFIDENTIAL) = "IBM release a new product XXXXX in XXXXX XXXXX. The product mitigates risks of Enterprise information leakage. The technology used in the product was developed at IBM Tokyo Research Laboratory"

(c) Dr(NON-CONFIDENTIAL) = "IBM will release a new product XXXXX in XXXXX XXXXX. The product prevents information leakage. IBM Tokyo Research Laboratory has developed the technology"

FIG. 18

(a) D = "IBM will release a new product XXXXX in XXXXX XXXXX. The product mitigates risks of Enterprise information leakage"

(b) D' = { IBM release new product XXXXX XXXXX XXXXX product mitigates risks of Enterprise information leakage }

FIG. 19

(a) Dp' = { IBM release new product Hogehoge September 2008 product mitigates risks Enterprise information leakage }

(b) Dq' = { IBM release new product XXXXX XXXXX XXXXX product mitigates risks Enterprise information leakage technology used product developed IBM Tokyo Research Laboratory }

(c) Dr' = { IBM release new product XXXXX XXXXX XXXXX product prevents information leakage IBM Tokyo Research Laboratory developed technology }

FIG. 20

CHARACTERISTIC INFORMATION c (x)

| | IBM | release | product | Hogehoge | September | 2008 | XXXXX |
|---|---|---|---|---|---|---|---|
| c (D') | 1 | 1 | 1 | 0 | 0 | 0 | 3 |
| c (Dp') | 1 | 1 | 1 | 1 | 1 | 1 | 0 |
| c (Dq') | 1 | 1 | 1 | 0 | 0 | 0 | 3 |
| c (Dr') | 1 | 1 | 1 | 0 | 0 | 0 | 3 |

FIG. 21

| | IBM | release | product | Hogehoge | September | 2008 | XXXXX |
|---|---|---|---|---|---|---|---|
| P=c(Dp') ∪ c (Dr') | 2 | 2 | 2 | 1 | 1 | 1 | 3 |
| P−c(Dq') | 1 | 1 | 1 | 1 | 1 | 1 | 0 |

FIG. 22

METHOD, APPARATUS AND COMPUTER PROGRAM FOR SUPPORTING DETERMINATION ON DEGREE OF CONFIDENTIALITY OF DOCUMENT

CROSS REFERENCE TO RELATED APPLICATION

This application is a continuation of and claims priority from U.S. application Ser. No. 12/709,878 filed on Feb. 22, 2010, which in turn claims priority under 35 U.S.C. 119 from Japanese Patent Application 2009-40339 filed Feb. 24, 2009, the entire contents of both applications are incorporated herein by reference.

BACKGROUND OF THE INVENTION

1. Field of the Invention

The present invention relates to determining a degree of confidentiality of a document shared by multiple organizations. More particularly, it relates to a method, an apparatus and a computer program for supporting such determination.

2. Description of Related Art

Opportunities to improve business efficiency by sharing information with multiple organizations by use of collaboration systems typified by groupware have been increasing. Nowadays, such collaboration systems are often implemented by using the Internet environment. In such case, if confidential information is mistakenly set to be sharable, such mistake increases the risk of a loss of credibility due to a leakage of personal information, and the risk of an economic loss due to a leakage of company confidential information, and the like. Accordingly, one of the most important tasks to be conducted is to correctly set a degree of confidentiality for information to be shared.

In addition, information to be shared, for example, office documents, may possibly include highly confidential information such as personal information of users and confidential business information. In an office, especially, it is common for a user who creates electronic document files to manage these documents on a computer that the user himself/herself uses, and frequently edits and updates the electronic document files. For this reason, confidential information management may have to depend on skills, morals and the like of each user.

Instead, many companies conduct integrated management of all the office documents on their management servers. In this case, however, it is difficult to trace how a file downloaded from the server by a user is updated and edited. Thus, the companies eventually rely on the morals of the user in order to manage confidential documents. Alternatively, a monitoring software product has been developed which is installed onto all the computers used by users to monitor the whole of update processing by all the users. Effective operation using such a monitoring software product, however, is difficult from the viewpoints of cost effectiveness and software maintenance. Moreover, if a member of a subcontracting company for system development downloads an office document, the member may update the office document in an environment outside the environment monitored by the monitoring software. In this case, the monitoring software product cannot monitor such update at all.

Another product called "Proofpoint" has also been released to prevent information leakage by determining degrees of confidentiality of documents based on the similarities of the documents. See Proofpoint, Internet <URL: http://www.source-pod.com/antivirus/proofpoint/function.html>. Japanese Patent Application Publication No. 2007-81955, for example, discloses an information processing apparatus that calculates the similarities in units of documents. More specifically, the information processing apparatus calculates similarities of each target document to given confidential documents, and determines the degree of confidentiality of the target document on the basis of the highest similarity among the similarities thus calculated. The information processing apparatus disclosed in Japanese Patent Application Publication No. 2007-81955, however, only calculates the similarities between a document whose degree of confidentiality is to be determined and confidential documents, and is incapable of determining which part in a confidential document is highly confidential. In other words, the information processing apparatus is capable of determining the degrees of confidentiality only in units of documents. Due to this incapability, this information processing apparatus has a problem that a document might be incorrectly determined as a confidential document although it is actually a non-confidential document.

Instead, another method has been also employed in which the degree of confidentiality of a document is recorded by embedding a character string such as "for internal use only," for example, into the document in accordance with a particular security policy. This method, however, has the following drawbacks. Specifically, as a result of the employment of this method, users have to be burdened with an operation of embedding a certain character string into a document. In addition, if an erroneous character string is embedded into a document, the document may be determined as having an incorrect degree of confidentiality in the confidentiality determination processing. To be more precise, if a user forgets to embed the character string "for internal use only" into a document to be originally treated as a confidential document, this document may be incorrectly determined as a non-confidential document without undergoing any confidential determination processing. Accordingly, this method still has a risk that such a confidential document may be widely shared.

SUMMARY OF THE INVENTION

In accordance with one aspect of the present invention, a method executable in a computer for supporting a determination of a degree of confidentiality of a document data set includes the steps of: storing each block of a document data set in association with confidentiality information that indicates whether or not the block is confidential, the document data set being dividable into a plurality of blocks, each of the blocks being a unit including properties evaluated as having a certain characteristic; acquiring a document data set whose degree of confidentiality is to be determined; determining whether a document data set, including a block similar to each of blocks of the acquired document data set, is stored; in response to a determination that the document data set including the similar block is stored, determining whether the confidentiality information indicating that the block is confidential is assigned to the block in the acquired document data set corresponding to the similar block; and in response to a determination that the confidentiality information indicating that the block is confidential has been assigned, determining that the acquired document data set is confidential.

In accordance with another aspect of the present invention, a method executable in a computer for supporting a determination of a degree of confidentiality of a document data set includes the steps of: storing a document data set assigned (i) confidentiality information indicating whether or not the document data set is confidential, and (ii) characteristic information representing a characteristic of the document data set; acquiring a document data set whose degree of confidentiality is to be determined; determining whether document data sets having characteristic information similar to the characteristic information of the acquired document data set are stored; if it is determined that document data sets having the similar characteristic information are stored, calculating a characteristic information difference between each pair of a confidential document data set and a non-confidential document data set from among the document data sets that have the similar characteristic information and are determined to be stored; judging whether the calculated characteristic information difference is included in the acquired document data set; determining that the acquired document data set is confidential when the calculated characteristic information difference is determined to be included in the acquired document data set; and determining that the acquired document data set is non-confidential when the calculated characteristic information difference is determined not to be included in the acquired document data set.

In accordance with still another aspect of the present invention, apparatus for determining confidentiality includes: confidentiality information storage means for storing each block of a document data set in association with confidentiality information that indicates whether or not the block is confidential, the document data set being dividable into a plurality of blocks, the blocks each being a unit including properties evaluated as having a certain characteristic; document data acquiring means for acquiring a document data set whose degree of confidentiality is to be determined; similarity judgment means for judging whether there is stored a document data set including a block similar to each of blocks of the acquired document data set; assignment judgment means for judging whether the confidentiality information indicating that the block is confidential is assigned to the block in the acquired document data set corresponding to the similar block, when the similarity judgment means judges that the document data set including the similar block is stored; and determination means for determining that the acquired document data set is confidential, under the condition that the assignment judgment means judges that the confidentiality information indicating that the block is confidential is assigned.

In accordance with a further aspect of the present invention, apparatus for determining confidentiality includes: characteristic information storage means for storing a document data set assigned confidentiality information indicating whether the document data set is confidential, and characteristic information representing a characteristic of the document data set; document data acquiring means for acquiring a document data set whose degree of confidentiality is to be determined; judgment means for judging whether there is stored a document data set having characteristic information similar to the characteristic information of the acquired document data set; difference calculation means for calculating a characteristic information difference between each pair of a confidential document data set and a non-confidential document data set from among document data sets that have the similar characteristic information and are judged as being stored, if the judgment means judges that the document data sets having the similar characteristic information are stored; difference inclusion judgment means for judging whether the calculated characteristic information difference is included in the acquired document data set; and determination means for (i) determining that the acquired document data set is confidential if the difference inclusion judgment means judges that the calculated characteristic information difference is included and (ii) determining that the acquired document data set is non-confidential if the difference inclusion judgment means judges that the calculated characteristic information difference is not included.

In accordance with still further aspects of the present invention, computer programs are provided which, when executed by a computer cause it to perform the above processes and to function as the above apparatuses.

BRIEF DESCRIPTION OF THE DRAWINGS

For a more complete understanding of the present invention and the advantages thereof, reference is now made to the following description taken in conjunction with the accompanying drawings.

FIGS. 6A and 6B show an example of the confidentiality determination processing in step S503.

FIGS. 7A and 7B show an example of the confidentiality determination processing in step S507.

FIGS. 8A and 8B show an example of the confidentiality determination processing in step S510.

FIGS. 16A and 16B show an example of characteristic information c(x) when the frequency of appearance of each word is used as the characteristic information.

FIG. 17 shows an example of a calculation result of a characteristic information difference.

FIGS. 18A to 18C show examples of document data sets stored in advance in a document data storage unit.

FIGS. 19A and 19B show examples of acquired document data sets.

FIGS. 20A to 20C show examples of document data sets extracted based on document data sets as having similar characteristic information.

FIG. 21 is a table showing a calculation result of the characteristic information c(x) of document data sets.

FIG. 22 is a table showing a calculation result of the difference between a union and the characteristic information of document data sets.

DETAILED DESCRIPTION OF THE PREFERRED EMBODIMENTS

Figure 1:
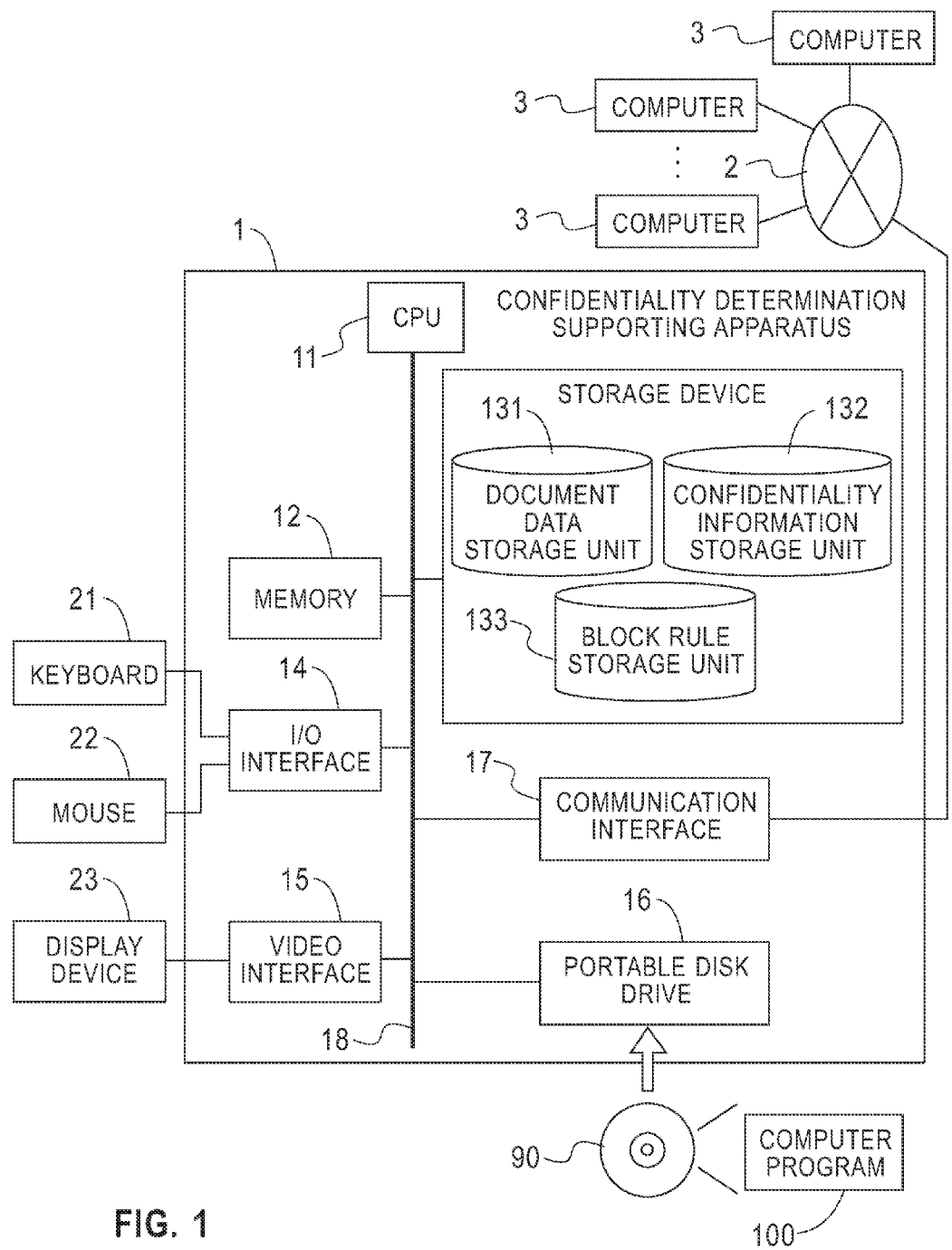
FIG. 1 is a block diagram showing a configuration example of a confidentiality determination supporting apparatus according to Embodiment 1 of the present invention.

The present invention provides a method, an apparatus and a computer program for supporting determination on a degree of confidentiality of an office document shared by multiple organizations, by reducing a burden on confidentiality determination processing on the document.

In order to achieve the above-mentioned aims, a method of a first aspect of the invention is a method executable in a computer for supporting a determination on a degree of confidentiality of a document data set, the method including the steps of: storing each block of a document data set in association with confidentiality information that indicates whether or not the block is confidential, the document data set being dividable into a plurality of blocks, the blocks each being a unit including properties evaluated as having a certain characteristic; acquiring a document data set whose degree of confidentiality is to be determined; judging whether or not there is stored a document data set including a block similar to each of blocks of the acquired document data set; if the document data set including the similar block is judged as being stored, judging whether or not the confidentiality information indicating that the block is confidential is assigned to the block in the acquired document data set corresponding to the similar block; and if the confidentiality information indicating that the block is confidential is judged as being assigned, determining that the acquired document data set is confidential.

A method of a second aspect of the invention includes the steps of: judging whether the confidentiality information is assigned to all the blocks; if it is judged whether there is a block not assigned the confidentiality information, extracting document data subsets that are subsets of the acquired document data set; judging whether or not all the document data subsets of the acquired document data set are non-confidential; and if all the document data subsets of the acquired document data set are judged as non-confidential, assigning the confidential information assigned to the similar block.

Additionally, a method of a third aspect of the invention includes the steps of: judging whether all the document data subsets of the acquired document data set are confidential; and if all the document data subsets of the acquired document data set are judged as confidential, assigning the acquired document data set the confidentiality information indicating that the document data set is confidential, when the degree of confidentiality is determined in units of document data sets.

A method according to a fourth aspect of the invention further includes the steps of: if all the document data subsets of the acquired document data set are judged as confidential, assigning the block in the acquired document data set the confidential information assigned to the similar block when the degree of confidentiality is determined in units of blocks.

A method according to a fifth aspect of the invention further includes the steps of: if the document data subsets of the acquired document data set include a non-confidential document data subset, extracting each document data set including the acquired document data set; judging whether all the document data sets each including the acquired document data set are non-confidential; and if all the document data sets are judged as non-confidential, assigning the acquired document data set the confidentiality information indicating that the document data set is non-confidential.

A method according to a sixth aspect of the invention further includes the steps of: if all the document data sets each including the acquired document data set are judged as including a confidential document data set, judging whether or not the similar block is assigned the confidentiality information indicating that the block is non-confidential; and if the similar block is judged as not being assigned the confidentiality information indicating that the block is non-confidential, receiving an input of a determination result indicating which confidentiality information is to be assigned to the block.

A method according to a seventh aspect of the invention is a method executable in a computer for supporting a determination on a degree of confidentiality of a document data set, the method including the steps of: storing a document data set assigned confidentiality information indicating whether or not the document data set is confidential, and characteristic information representing a characteristic of the document data set; acquiring a document data set whose degree of confidentiality is to be determined; judging whether or not there is stored document data set having characteristic information similar to the characteristic information of the acquired document data set; if it is judged that document data sets having the similar characteristic information are stored, calculating a characteristic information difference between each pair of a confidential document data set and a non-confidential document data set from among the document data sets that have the similar characteristic information and are judged as being stored; judging whether the calculated characteristic information difference is included in the acquired document data set; and determining that the acquired document data set is confidential if the calculated characteristic information difference is judged as being included in the acquired document data set, and determining that the acquired document data set is non-confidential if the calculated characteristic information difference is judged as not being included in the acquired document data set.

A method according to an eighth aspect of the invention is the above method further including the steps of: if it is judged that a plurality of document data sets having similar characteristic information are stored, obtaining a union of the characteristic information of the plurality of document data sets that have the similar characteristic information and are judged as being stored; and calculating a characteristic information difference between a union of the characteristic information of one or more confidential document data sets and a union of the characteristic information of one or more non-confidential document data sets when these two unions are obtained.

A method according to a ninth aspect of the invention is an apparatus including: confidentiality information storage means for storing each block of a document data set in association with confidentiality information that indicates whether or not the block is confidential, the document data set being dividable into a plurality of blocks, the blocks each being a unit including properties evaluated as having a certain characteristic; document data acquiring means for acquiring a document data set whose degree of confidentiality is to be determined; similarity judgment means for judging whether or not there is stored a document data set including a block similar to each of blocks of the acquired document data set; assignment judgment means for judging whether or not the confidentiality information indicating that the block is confidential is assigned to the block in the acquired document data set corresponding to the similar block, if the similarity judgment means judges that the document data set including the similar block is stored; and determination means for determining that the acquired document data set is confidential, if the assignment judgment means judges that the confidentiality information indicating that the block is confidential is assigned.

A method according to a tenth aspect of the invention is an apparatus including: characteristic information storage means for storing a document data set assigned confidentiality information indicating whether or not the document data set is confidential, and characteristic information representing a characteristic of the document data set; document data acquiring means for acquiring a document data set whose degree of confidentiality is to be determined; judgment means for judging whether there is stored a document data set having characteristic information similar to the characteristic information of the acquired document data set; difference calculation means for calculating a characteristic information difference between each pair of a confidential document data set and a non-confidential document data set from among document data sets that have the similar characteristic information and are judged as being stored, if the judgment means judges that the document data sets having the similar characteristic information are stored; difference inclusion judgment means for judging whether the calculated characteristic information difference is included in the acquired document data set; and determination means for determining that the acquired document data set is confidential if the difference inclusion judgment means judges that the calculated characteristic information difference is included, and determining that the acquired document data set is non-confidential if the difference inclusion judgment means judges that the calculated characteristic information difference is not included.

A method according to an eleventh aspect of the invention is a computer program executable in a computer for supporting a determination on a degree of confidentiality of a document data set, the computer program allowing the computer to function as: document data acquiring means for acquiring a document data set whose degree of confidentiality is to be determined; similarity judgment means for judging whether or not there is stored a document data set including a block similar to each of blocks of the acquired document data set; assignment judgment means for judging whether or not the confidentiality information indicating that the block is confidential is assigned to the block in the acquired document data set corresponding to the similar block, if the similarity judgment means judges that the document data set including the similar block is stored; and determination means for determining that the acquired document data set is confidential, if the assignment judgment means judges that the confidentiality information indicating that the block is confidential is assigned.

A method according to a twelfth aspect of the invention is a computer program executable in a computer for supporting a determination on a degree of confidentiality of a document data set, the computer program allowing the computer to function as: characteristic information storage means for storing a document data set assigned confidentiality information indicating whether or not the document data set is confidential, and characteristic information representing a characteristic of the document data set; document data acquiring means for acquiring a document data set whose degree of confidentiality is to be determined; judgment means for judging whether there is stored a document data set having characteristic information similar to the characteristic information of the acquired document data set; difference calculation means for calculating a characteristic information difference between each pair of a confidential document data set and a non-confidential document data set from among document data sets that have the similar characteristic information and are judged as being stored, if the judgment means judges that the document data sets having the similar characteristic information are stored; difference inclusion judgment means for judging whether the calculated characteristic information difference is included in the acquired document data set; and determination means for determining that the acquired document data set is confidential if the difference inclusion judgment means judges that the calculated characteristic information difference is included, and determining that the acquired document data set is non-confidential if the difference inclusion judgment means judges that the calculated characteristic information difference is not included.

Hereinafter, confidentiality determination supporting apparatuses according to embodiments of the present invention are described in detail on the basis of the accompanying drawings. The following embodiments are not intended to limit the invention described in the scope of claims, and also that all the combinations of characteristic features described in the embodiments are not necessarily essential to solving means for the present invention.

Moreover, the present invention can be implemented in many various other modes, and thus should not be interpreted by being limited to the description of the embodiment. The same reference numerals are attached to the same elements throughout the embodiment.

The following embodiments are explained based on a confidentiality determination supporting apparatus obtained by installing a computer program onto a computer system. As is obvious to those skilled in the art, part of the present invention can be implemented as a computer program executable by a computer. Thus, the present invention can be implemented in an embodiment of hardware such as a confidentiality determination supporting apparatus, an embodiment as software, or an embodiment of a combination of software and hardware. The computer program can be recorded in any recording medium, readable by any computer, such as a hard disk, a DVD, a CD, an optical storage device, and a magnetic storage device.

In Embodiment 1 of the present invention, a document data set stored to be sharable between multiple users is stored in such a manner that blocks of the document data set are each associated with confidentiality information indicating whether or not the block is confidential. A document data set is acquired as a target for confidentiality determination processing. On the basis of criteria such as whether there is stored a document data set including a block similar to each block of the acquired document data set, and whether the confidentiality information indicating that the block is confidential is assigned to the block of the acquired document data set corresponding to the similar block, a user is allowed to skip the confidentiality determination processing for a block which is obviously confidential, or for a block which is obviously non-confidential.

In this way, whether or not each document data set is confidential can be determined based on the confidentiality information assigned to the blocks of the document data set, without requiring the user to determine the degrees of confidentiality of blocks that can be obviously determined as non-confidential and as confidential. Thus, the confidentiality determination processing does not need to be performed for all the blocks, and therefore the present invention achieves reduction in burden required for the confidentiality determination processing.

Here, a "property" of a document data set is referred to as a word, drawing and the like included in the document data set; and a "block" is referred to as a unit that includes properties having a certain characteristic that can be quantitatively evaluated by a mechanical metrics and has confidentiality information unchanged unless a user updates the information of the block. For example, one slide is regarded as one block for a document created by use of presentation software, and a set of sentences included in a unit such as a chapter or a section, for example, is regarded as one block for a document created by use of word processor software. Instead, a set of sentences in a unit such as a page and a paragraph or even one sentence may be regarded as one block. Thus, one block may include one sentence or multiple sentences.

In Embodiment 2 of the present invention, a document data set assigned confidentiality information indicating whether or not the document data set is confidential, and characteristic information representing a characteristic of the document data set are stored. Then, a document data set whose degree of confidentiality is to be determined is acquired, and it is judged whether or not there is stored a document data set having characteristic information similar to the characteristic information of the acquired document data set.

If it is judged that document data sets having similar characteristic information are stored, a characteristic information difference is calculated between each pair of a confidential document data set and a non-confidential document data set from among the document data sets that are judged as being stored and have the similar characteristic information. The acquired document data set is determined as confidential if the calculated characteristic information difference is judged as being included in the acquired document data set, and the acquired document data set is determined as non-confidential if the calculated characteristic information difference is judged as not being included in the acquired document data set.

In this way, by calculating a difference between document data sets determined as confidential and as non-confidential, a part of a document data set considered important for the confidential information can be estimated with high accuracy. Thereby, the degree of confidentiality of the document data set can be determined with high accuracy.

FIG. 1 is a block diagram showing a configuration example of a confidentiality determination supporting apparatus according to Embodiment 1 of the present invention. The confidentiality determination supporting apparatus according to Embodiment 1 of the present invention includes at least a central processing unit (CPU) 11, a memory 12, a storage device 13, an I/O interface 14, a video interface 15, a portable disk drive 16, a communication interface 17 and an internal bus 18 which connects the aforementioned hardware units to each other.

The CPU 11 is connected to each of the aforementioned hardware units of the confidentiality determination supporting apparatus 1 through the internal bus 18. The CPU 11 controls operations of each of the aforementioned hardware units and executes various software functions according to a computer program 100 stored in the storage device 13. The memory 12 is formed of a volatile memory such as a SRAM or a SDRAM. In the memory 12, a load module is expanded at a time of execution of the computer program 100 and temporal data and the like generated during the execution of the computer program 100 are stored.

The storage device 13 is formed of a built-in fixed storage device (hard disk), a volatile memory such as a SRAM, a non-volatile memory such as a ROM, and the like. The computer program 100 stored in the storage device 13 is downloaded by the portable disk drive 16 from a portable recording medium 90 such as a DVD or CD-ROM on which information such as the program and data is recorded. The computer program 100 is executed after being loaded into the memory 12 from the storage device 13. Instead, the computer program 100 may be a computer program downloaded through the communication interface 17 from any of external computers 3, 3, . . . , connected to a network 2.

The storage device 13 includes a document data storage unit 131, a confidentiality information storage unit 132 and a block rule storage unit 133. Document data sets each dividable into blocks are acquired and then are stored in the document data storage unit 131. It should be noted that the document data storage unit 131 is sharable between predetermined users within the network 2, and allows the external computers 3, 3, . . . , to execute read processing, update processing and other processing thereon.

The confidentiality information storage unit 132 stores confidentiality labels (hereinafter, referred to as a label) respectively given as the confidentiality information to each document data set and each block of the document data set. There are two types of labels one of which indicates that the document data set or block is confidential and the other of which indicates that the document data set or block is non-confidential.

The block rule storage unit 133 stores information on block dividing rules for dividing a document data set into blocks, while associating the rules with types of the document data sets, such as the file identifiers of the document data files and the creators of the document data sets, for example. More specifically, if a document data set is data of power point (registered trademark) that is a Microsoft (registered trademark) product, the file identifier is ".ppt". For this reason, for a document data set whose file identifier is ".ppt", the block rule storage unit 133 stores a block dividing rule of dividing the document data set into blocks in units of slides.

Moreover, for each creator ID that identifies a creator of a document data set, the block rule storage unit 133 stores a block dividing rule of dividing the document data set into blocks according to document writing practices of the creator. For example, even though there is a difference in how to make chapters among creator IDs, the block rule storage unit 133 stores the block dividing rules of dividing a document data set into blocks in units of chapters according to the practices of the respective creator IDs.

The communication interface 17 is connected to the internal bus 18, and is thereby connected to the external network 2 such as the internet, a LAN, a WAN and the like. In this way, the confidentiality determination supporting apparatus 1 is allowed to transmit and receive data to and from the external computers 3, 3, . . . , and the like.

The I/O interface 14 is connected to data input media such as a keyboard 21 and a mouse 22, and receives input of data. The video interface 15 is connected to a display device 23 such as a CRT monitor or a LCD, and allows certain images to be displayed on the display device 23.

Figure 2:
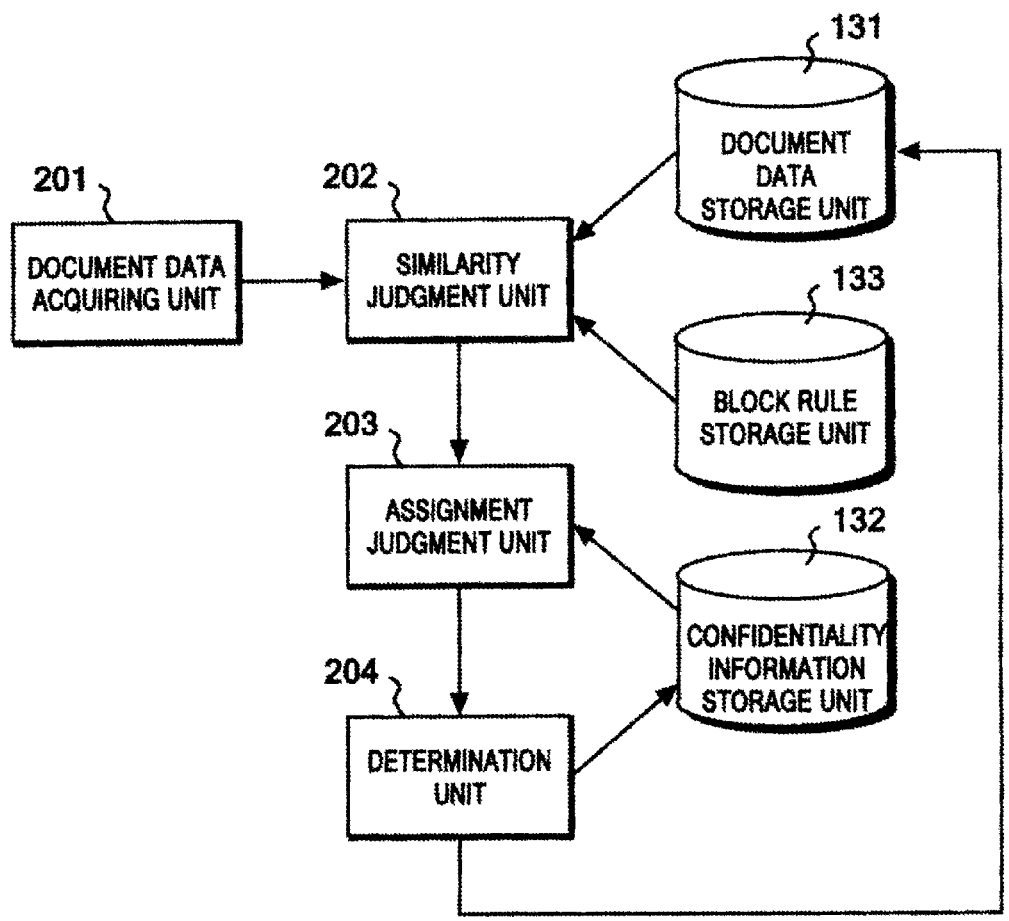
FIG. 2 is a functional block diagram of the confidentiality determination supporting apparatus according to Embodiment 1 of the present invention.

FIG. 2 is a functional block diagram of the confidentiality determination supporting apparatus 1 according to Embodiment 1 of the present invention. A document data acquiring unit 201 acquires a document data set targeted for the confidentiality determination. A way to acquire the document data set is not limited to a particular one. For example, the document data acquiring unit 201 may acquire the document data set from any of the external computers 3, 3, ..., through the network 2, or may acquire the document data set from the portable recording medium 90.

A similarity judgment unit 202 reads document data sets stored in the document data storage unit 131, and divides the acquired document data set into multiple blocks on the basis of the information on the block dividing rules stored in the block rule storage unit 133. Then, for each of the divided blocks, the similarity judgment unit 202 judges whether or not a document data set including a block similar to the each block is stored in the document data storage unit 131.

In the case where the similarity judgment unit 202 judges that the document data set including the similar block is stored, an assignment judgment unit 203 extracts the label stored in the confidentiality information storage unit 132, for each document data set or each block of the document data set, and judges whether or not the similar block in the acquired document data set is assigned the label (confidentiality information) indicating that the block is confidential, in reference to the confidentiality information storage unit 132. Specifically, if a label is already assigned to the block in the acquired document data set judged as similar to one of the blocks in the document data set stored in the document data storage unit 131, and if the label indicates that the block is confidential, the block in the acquired document data set can be determined as having a high degree of confidentiality.

If no label is assigned to the block in the acquired document data set, the block in the acquired document data set is assigned the label of the one block, judged as the similar block, in the document data set stored in the document data storage unit 131. Here, there is another case where the label is already assigned to the block in the acquired document data set and where there is inconsistency between the labels assigned to the similar blocks in the acquired document data set and the document data set stored in the document data storage unit 131. This is a case where one of the labels is a label indicating that the block is confidential, and the other one is a label indicating that the block is non-confidential. In this case, for each of such blocks in the acquired document data set, an input indicating which one of the labels is to be assigned to the block is received from a user.

If the assignment judgment unit 203 judges that the block in the acquired document data set is assigned the label indicating that the block is confidential, a determination unit 204 determines that the whole of the acquired document data set is confidential. To be more precise, for a document data set having a block with a high degree of confidentiality, the determination unit 204 can determine that the whole of the document data set is confidential. The determination result (label) indicating that the whole of the document data set is confidential and the document data set are stored in the confidentiality information storage unit 132 and the document data storage unit 131, respectively, in association with each other. The determination result and the document data set thus stored can be used to determine the degree of confidentiality of a document data set which will be acquired next.

Figure 3:
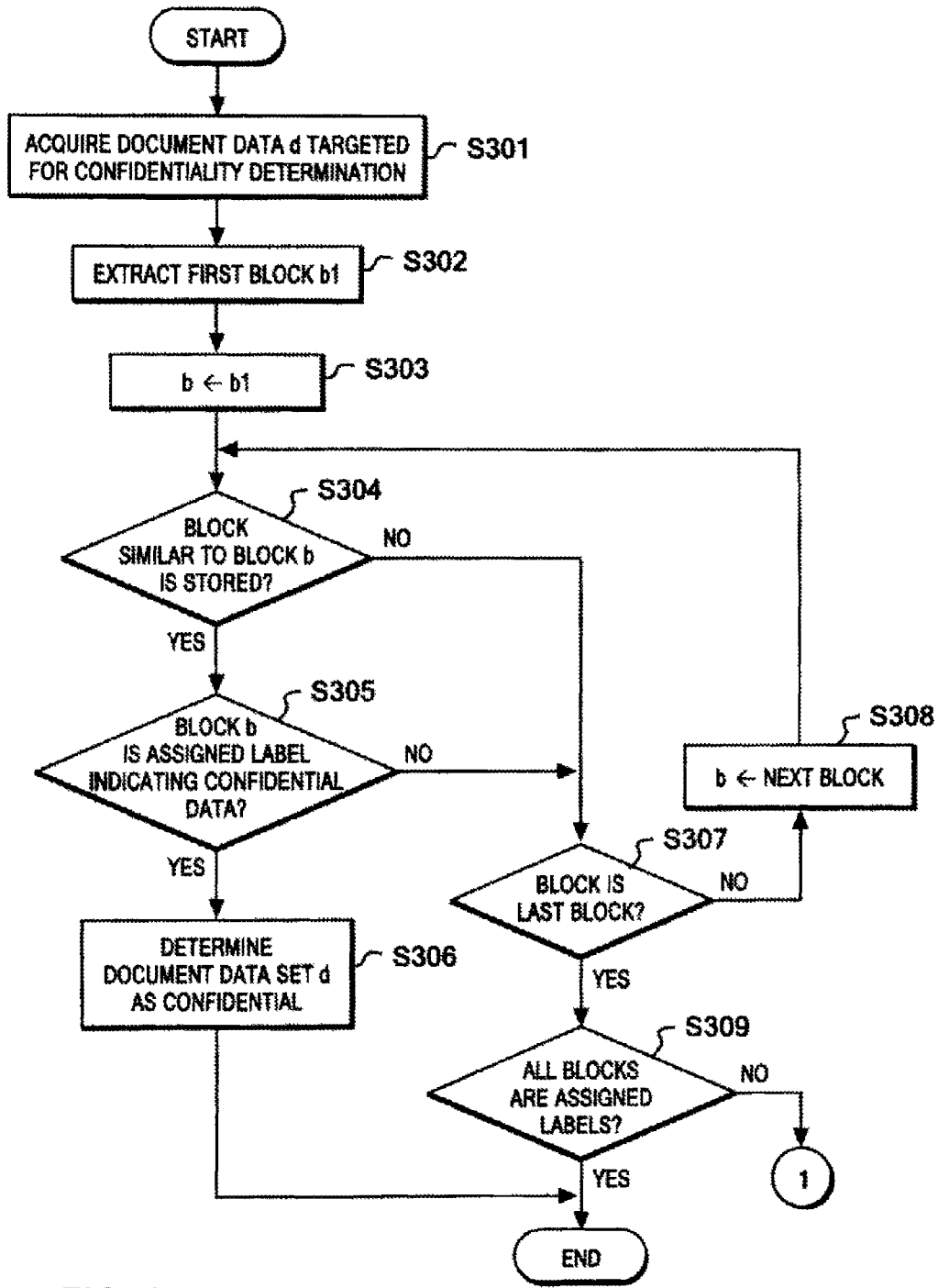
FIG. 3 is a flowchart showing processing procedures in which a CPU of the confidentiality determination supporting apparatus according to Embodiment 1 of the present invention determines the degree of confidentiality of the whole of a document data set.

FIG. 3 is a flowchart showing processing procedures in which the CPU 11 of the confidentiality determination supporting apparatus 1 according to Embodiment 1 of the present invention determines the degree of confidentiality of the whole of a document data set. As shown in FIG. 3, the CPU 11 of the confidentiality determination supporting apparatus 1 acquires a document data set d targeted for the confidentiality determination (step S301). More specifically, the document data set d may be received from any of the external computers 3, 3, ..., or may be read from document data sets stored in the storage device 13. Instead, the document data set d may be read through the portable recording medium 90.

The CPU 11 extracts the first block b1 of the acquired document data set d (step S302) and sets the block b1 as a block b targeted for the similarity judgment (step S303). Here, the document data set is divided into blocks on the basis of the information on the block dividing rule stored in the block rule storage unit 133. For example, when the document data set is document data created by PowerPoint (registered trademark), the first slide is the block b1.

The CPU 11 judges whether or not a document data set including a block similar to the block b is stored in the document data storage unit 131 (step S304). If the CPU 11 judges that a document data set including a block similar to the block b is stored in the document data storage unit 131 (step S304: YES), the CPU 11 judges whether or not the block b is assigned the label indicating that it b is confidential (step S305). If the CPU 11 judges that the block b is assigned the label indicating that it b is confidential (step S305: YES), the CPU 11 judges that the extracted block b is a block with a high degree of confidentiality, and determines that the document data set d is confidential (step S306). Then, the CPU 11 stores the acquired document data set d and the determination result indicating that the whole of the document data set d is confidential in the document data storage unit 131 and the confidentiality information storage unit 132, respectively, in association with each other.

If the CPU 11 judges that no document data set including a block similar to the block b is stored in the document data storage unit 131 (step S304: NO) or if the CPU 11 judges that the block b is not assigned the label indicating that the block is confidential (step S305: NO), the CPU 11 judges whether or not the block b is the last block (step S307). If the CPU 11 judges that the block b is not the last block (step S307: NO), the CPU 11 extracts the next block and sets the extracted block as the block b targeted for the similarity judgment (step S308), and iteratively performs the foregoing processing after bringing the processing back to step S304.

If the CPU 11 judges that the block b is the last block (step S307: YES), the CPU 11 judges that all the blocks in the document data set d are assigned labels (step S309). If the CPU 11 judges that all the blocks in the document data set d are assigned labels (step S309: YES), the CPU 11 terminates the processing. If the CPU 11 judges that the blocks in the document data set d still include a block not assigned any label (step S309: NO), the CPU 11 executes more in-depth confidentiality determination processing on the basis of inclusion relation between the document data set d targeted for the confidentiality determination and the document data sets stored in the document data storage unit 131.

Figure 4:
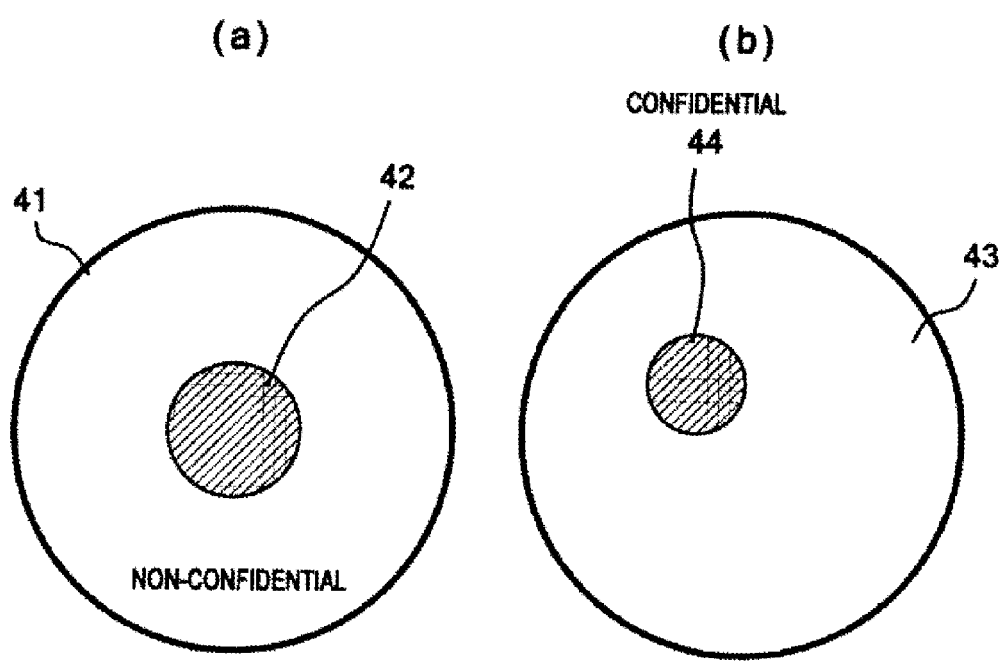
FIGS. 4A and 4B are diagrams of sets showing relation among document d, a document data set including the document data set d as a sub document, and a block included in the document data set d.

FIGS. 4A and 4B are diagrams of sets showing relation among a document data set d, a document data set including the document data set d as a sub document, and a block included in the document data set d. FIG. 4A is a diagram for explaining a case where, assuming that a universal set 41 is the document data set d, a subset 42 is deleted from the universal set 41 including the subset 42. In FIG. 4A, the label indicating that the document data set is non-confidential is assigned to the universal set 41 of the document data set d. For this reason, when any document data set and any block in the document data set is deleted as the subset 42, the document data set d can be determined as non-confidential.

Similarly, in FIG. 4B, assuming that the document data set d is a subset 44, the label indicating that the document data set is confidential is assigned to the subset 44. In this case, even if any document data set assigned the label indicating that the document data set is non-confidential is added in any manner to a universal set 43 including the subset 44, the entire document data set including the document data set d, which is equivalent to the universal set 43, can be determined as confidential because the universal set 43 includes the subset 44 assigned the label indicating that the subset is confidential.

Figure 5:
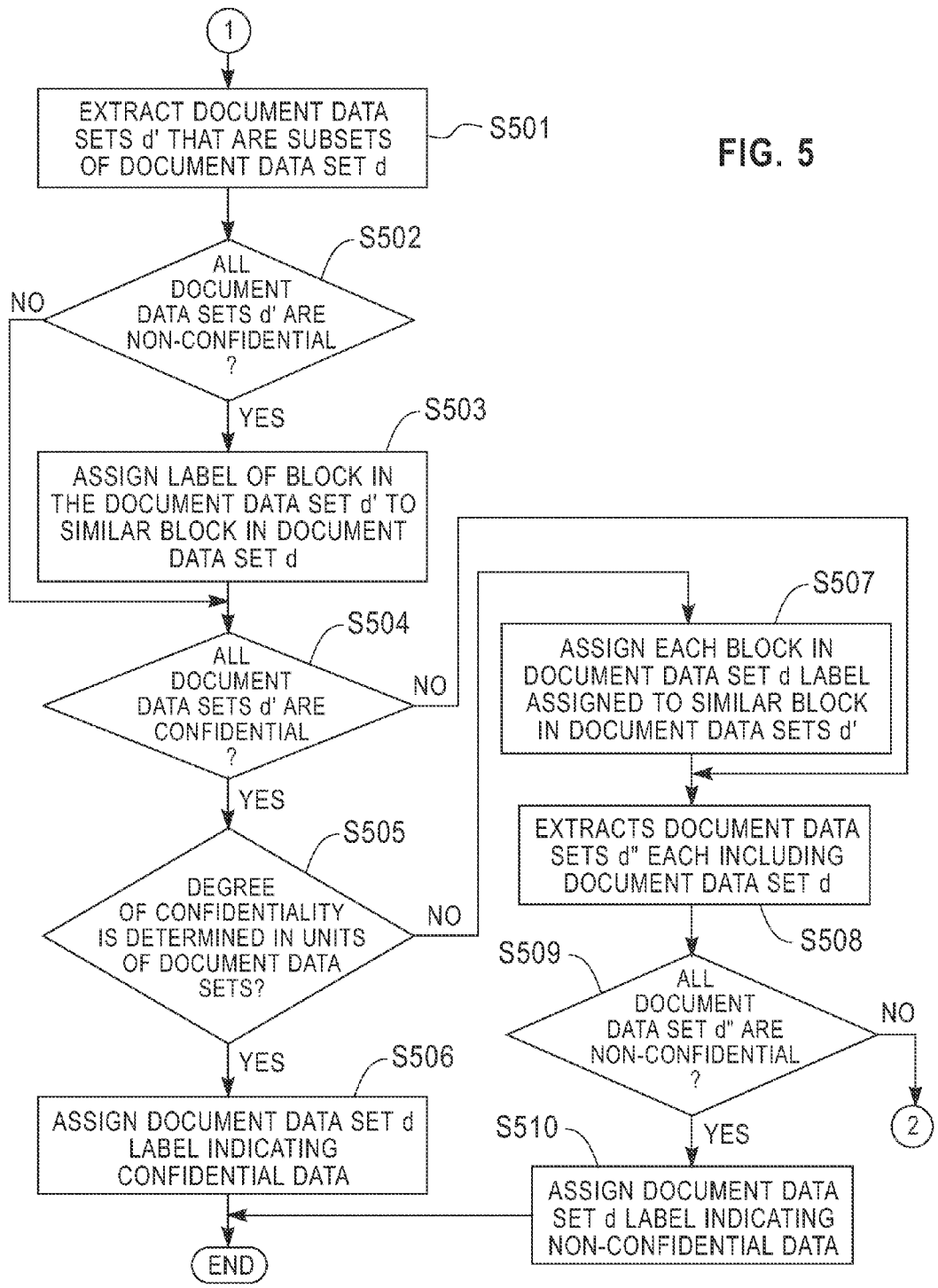
FIG. 5 is a flowchart showing processing procedures in which the CPU of the confidentiality determination supporting apparatus according to Embodiment 1 of the present invention determines the degree of confidentiality of a document data set when the document data set whose degree of confidentiality is to be determined has inclusion relation.

FIG. 5 is a flowchart showing processing procedures in which the CPU 11 of the confidentiality determination supporting apparatus 1 according to Embodiment 1 of the present invention determines the degree of confidentiality of a document data set d when the document data set d, targeted for the confidentiality determination, has inclusion relation. In the case where the CPU 11 of the confidentiality determination supporting apparatus 1 judges that the document data set d still includes a block not assigned any label (step S309: NO), the CPU 11 extracts multiple document data sets d' which are subsets of the document data set d (step S501).

The CPU 11 judges whether or not the label indicating that the document data set is non-confidential is assigned to each of all the document data sets d' (step S502). If the CPU 11 judges that each of all the document data sets d' is assigned the label indicating that the document data set is non-confidential (step S502: YES), the CPU 11 assigns the label of each block in the extracted document data sets d' to its corresponding similar block in the extracted document data sets d (step S503).

Here, there is a case where a label is assigned to a block in the acquired document data set d, and where the label is inconsistent with a label assigned to a corresponding block in the extracted document data set d'. Specifically, this is a case where one of the labels is a label indicating that the document data set is confidential and the other one is a label indicating that the document data set is non-confidential. In this case, for each block, an input indicating which one of the labels is to be assigned to the block is received from a user. In this way, the confidentiality determination only requires the user to determine the degrees of confidentiality for blocks whose degree of confidentiality cannot be determined mechanically. Thus, a burden of the confidentiality determination processing on the user can be reduced.

FIGS. 6A and 6B show an example of the confidentiality determination processing in step S503. FIG. 6A shows the document data set d' extracted from the document data storage unit 131, whereas FIG. 6B shows the document data set d acquired as a target for the confidentiality determination.

In FIG. 6A, blocks b1 and b2 are already assigned the label indicating that the block is non-confidential. In FIG. 6B, blocks b1 and b2 are also already assigned the label indicating that the block is non-confidential. In this case, the labels are not inconsistent between FIGS. 6A and 6B. Accordingly, without the user's determining the degrees of confidentiality of the blocks b1 and b2, the blocks b1 and b2 can be kept being assigned the label indicating that the block is non-confidential.

In contrast, the document data set d' does not include a block b3 in FIG. 6A, whereas the document data set d additionally includes a block b3 in FIG. 6B. In this case, in order to determine whether or not the document data set d is non-confidential, a determination needs to be made as to whether or not the additional block b3 is assigned the label indicating that the block is non-confidential. Thus, the block b3 is a block (the hatched part) targeted for the confidentiality determination.

Turning back to FIG. 5, if the CPU 11 of the confidentiality determination supporting apparatus 1 judges that there is the extracted document data set d' not assigned the label indicating that the document data set is non-confidential (step S502: NO), the CPU 11 skips step S503 and judges whether or not the label indicating that the document data set is confidential is assigned to each of all the extracted document data sets d' (step S504). If the CPU 11 judges that the label indicating that the document data set is confidential is assigned to each of all the extracted document data sets d' (step S504: YES), the CPU 11 determines whether or not the degree of confidentiality is determined in units of document data sets (step S505).

If the CPU 11 determines that the degree of confidentiality is determined in units of document data sets (step S505: YES), the CPU 11 assigns the document data set d the label indicating that the document data set is confidential (step S506), and terminates the processing. In other words, the document data set d including, as a subset, the document data set d' assigned the label indicating that the document data set is confidential in units of document data sets can be determined as confidential as similar to the case in FIG. 4B.

If the CPU 11 judges that the degree of confidentiality is not determined in units of document data (step S505: NO), the CPU 11 assigns the label of each block in the extracted document data sets d' to its corresponding similar block in the document data set d (step S507).

Here, there is a case where the label indicating that the document data set is confidential is assigned to each of all the extracted document data sets d' and where a concerned block in the document data sets d' is assigned the inconsistent label. Specifically, this is a case where one of the labels is a label indicating that the document data set is confidential and the other one is a label indicating that the document data set is non-confidential. In this case, for each block, an input indicating which one of the labels is to be assigned to the block is received from a user. In this way, the confidentiality determination only requires the user to determine the degrees of confidentiality for blocks whose degrees of confidentiality cannot be determined mechanically. Thus, a burden of the confidentiality determination processing on the user can be reduced.

FIGS. 7A and 7B show an example of the confidentiality determination processing in step S507. FIG. 7A shows the document data set d' extracted from the document data storage unit 131, whereas FIG. 7B shows the document data set d acquired as a target for the confidentiality determination.

In FIG. 7A, blocks b1 and b2 are already assigned the label indicating that the block is confidential. In FIG. 7B, blocks b1 and b2 are also already assigned the label indicating that the block is confidential. In this case, the labels are not inconsistent between FIGS. 7A and 7B. Accordingly, without the user's determining the degrees of confidentiality of the blocks b1 and b2, the blocks b1 and b2 can be kept being assigned the label indicating that the block is confidential.

In contrast, the document data set d' does not include a block b3 in FIG. 7A, whereas the document data set d additionally includes a block b3 in FIG. 7B. In this case, in order to determine whether or not the document data set d is confidential, a determination needs to be made as to whether or not the additional block b3 is assigned the label indicating that the block is confidential. Thus, the block b3 is a block (the hatched part) targeted for the confidentiality determination.

Turning back to FIG. 5, if the CPU 11 of the confidentiality determination supporting apparatus 1 judges that the extracted multiple document data sets d' include a document data set d' not assigned the label indicating that the document data set is confidential (step S504: NO), the CPU 11 skips steps S505 and S507, and extracts document data sets d" each including the document data set d (step S508). The CPU 11 judges whether or not the label indicating that the document data set is non-confidential is assigned to each of all the extracted document data sets d" (step S509).

If the CPU 11 judges that the label indicating that the document data set is non-confidential is assigned to each of all the extracted document data sets d" (step S509: YES), the CPU 11 assigns the document data set d the label indicating that the document data set is non-confidential (step S510), and terminates the processing.

Here, in the case where the label indicating that the document data set is non-confidential is assigned to each of the extracted document data sets d", the whole of the document data set d" is kept confidential even when a block equivalent to any subset is deleted as shown in FIG. 4A. Thus, a burden of the confidentiality determination processing on the user can be reduced.

FIGS. 8A and 8B show an example of the confidentiality determination processing in step S510. FIG. 8A shows the document data set d" extracted from the document data storage unit 131, whereas FIG. 8B shows the document data set d acquired as a target for the confidentiality determination.

In FIG. 8A, blocks b1, b2 and b3 are already assigned the label indicating that the block is non-confidential. In FIG. 8B, blocks b1 and b2 are also already assigned the label indicating that the block is non-confidential. In this case, the labels of the blocks b1 and b2 are not inconsistent between FIGS. 8A and 8B. Accordingly, the blocks b1 and b2 are obviously assigned the label indicating that the block is non-confidential without the user's determining the degrees of confidentiality of the blocks b1 and b2. Thus, there is no block whose degree of confidentiality needing to be determined by the user.

Turning back to FIG. 5, if the CPU 11 of the confidentiality determination supporting apparatus 1 judges that the extracted multiple document data sets d" include a document data set d" not assigned the label indicating that the document data set is non-confidential (step S509: NO), the CPU 11 performs more in-depth confidentiality determination processing on the basis of whether or not each of the document data sets assigned the labels includes a block similar to a block of the document data set d targeted for the confidentiality determination.

Figure 9:
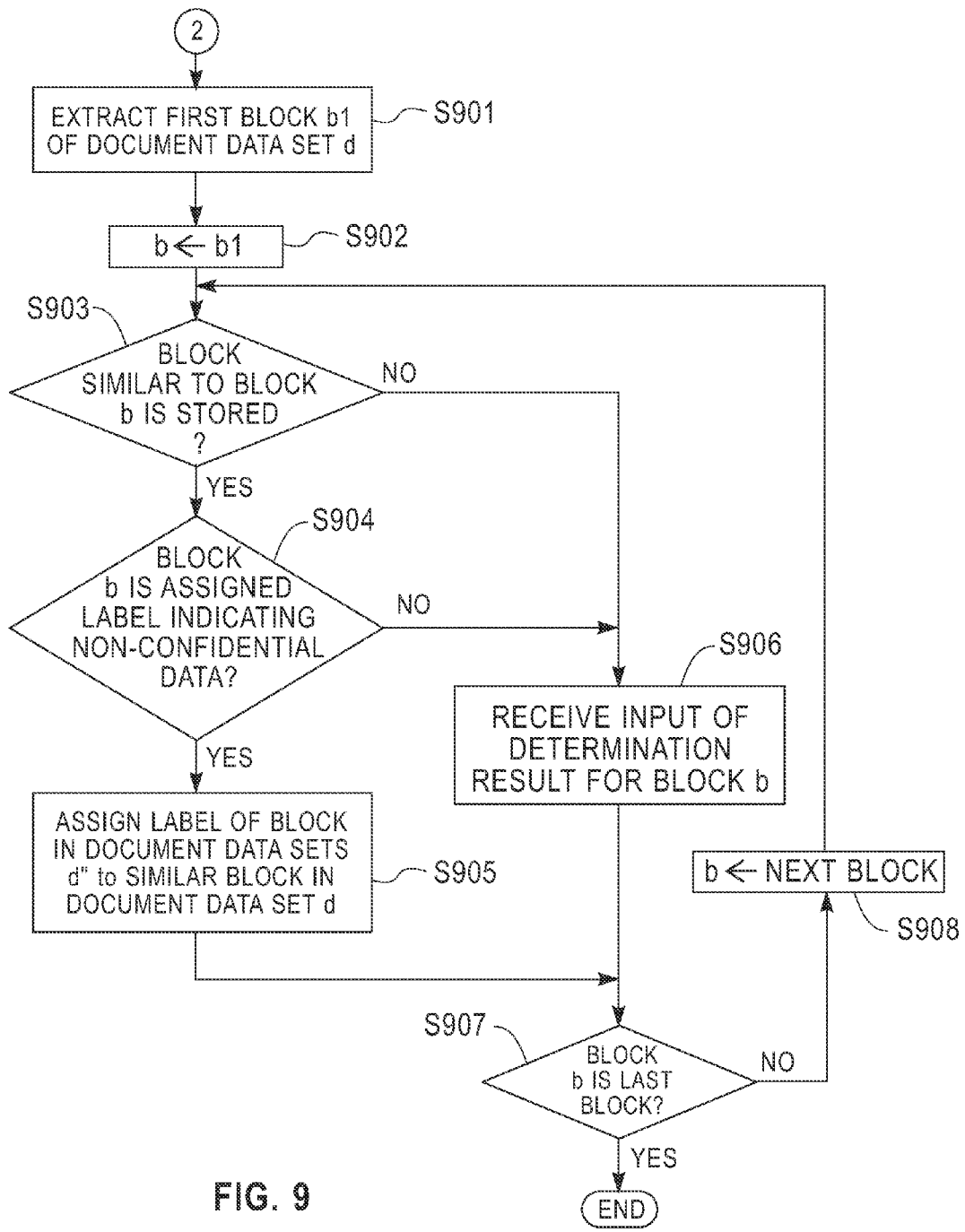
FIG. 9 is a flowchart showing detailed processing procedures in which the CPU of the confidentiality determination supporting apparatus determines the degree of confidentiality according to Embodiment 1 of the present invention.

FIG. 9 is a flowchart showing detailed processing procedures in which the CPU 11 of the confidentiality determination supporting apparatus 1 determines the degree of confidentiality according to Embodiment 1 of the present invention. As shown in FIG. 9, the CPU 11 of the confidentiality determination supporting apparatus 1 judges that the extracted multiple document data sets d" include a document data set d" not assigned the label indicating that the document data set is non-confidential (step S509: NO), the CPU 11 extracts the first block b1 of the acquired document data set d (step S901), and sets the first block as the block b targeted for similarity judgment (step S902). The document data set d is divided into blocks on the basis of the information on the block dividing rules stored in the block rule storage unit 133. For example, when the document data set is document data created by PowerPoint (registered trademark), the first slide is the block b1.

The CPU 11 judges whether or not the document data storage unit 131 stores a document data set that includes a block similar to the block b from among the document data sets each being as a whole assigned a label (step S903). If the CPU 11 judges that a document data set including a block similar to the block b is stored in the document data storage unit 131 (step S903: YES), the CPU 11 judges whether or not the block b is assigned the label indicating that the block is non-confidential (step S904).

If the CPU 11 judges that the block b is assigned the label indicating that the block is non-confidential (step S904: YES), the CPU 11 assigns the label of each block in the extracted document data sets d" to its corresponding similar block in the document data set d (step S905).

Figure 10:
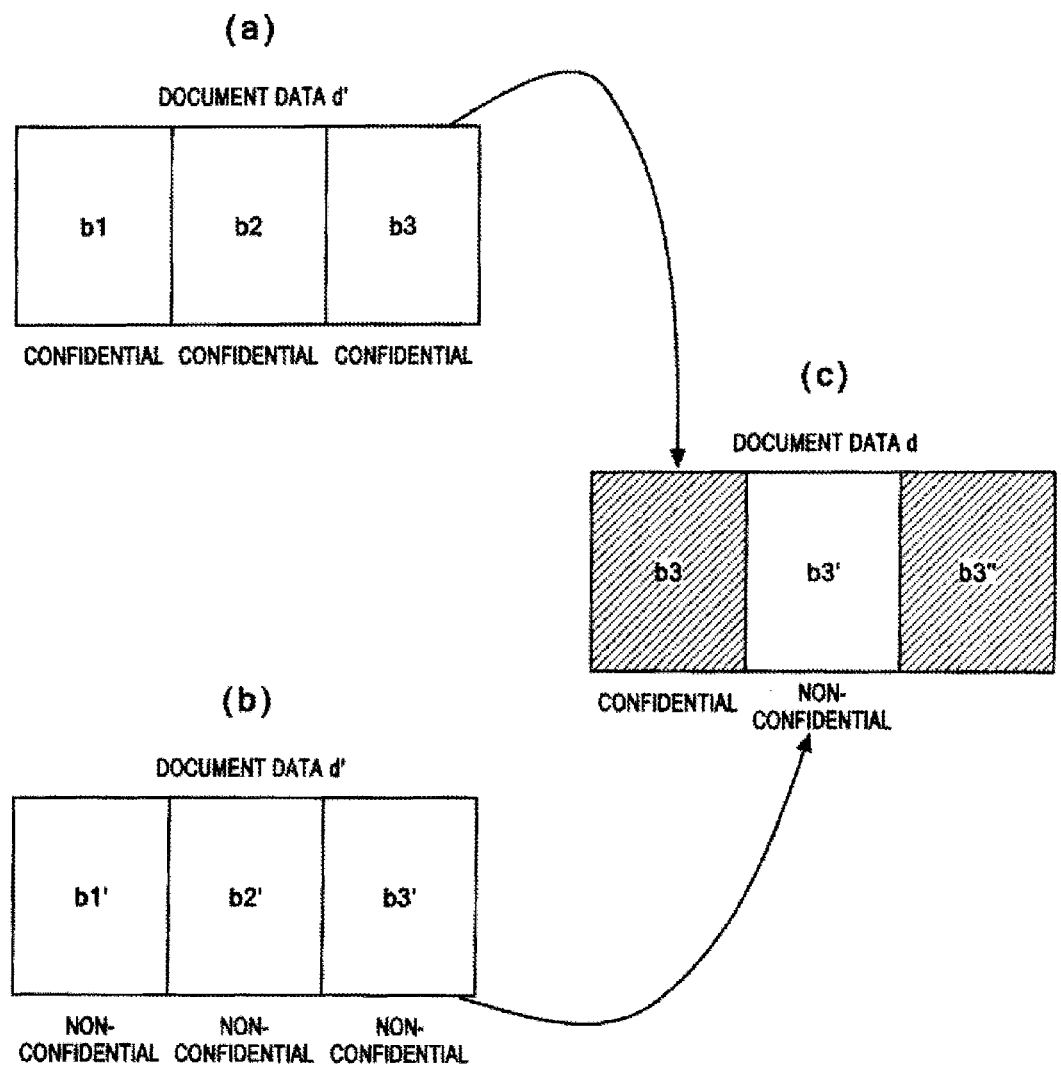
FIGS. 10A to 10C show a first example of the confidentiality determination processing in step S905.

Note that an input indicating which one of the label indicating that the block is confidential and the label indicating that the block is non-confidential is to be assigned to the block needs to be received from a user in some cases depending on the labels assigned to all the extracted document data sets. FIGS. 10A to 10C show a first example of the confidentiality determination processing in step S905. FIGS. 10A and 10B show the document data sets d' extracted from the document data storage unit 131, whereas FIG. 10C shows document data set d acquired as a target for the confidentiality determination.

In FIGS. 10A to 10C, all the blocks in the document data set d' in FIG. 10A are assigned the label indicating that the block is confidential, all the blocks in the document data set d' in FIG. 10B are assigned the label indicating that the block is non-confidential, and the document data set d in FIG. 10C consists of the block b3 of the document data set d' shown in FIG. 10A, the block b3' of the document data set d' shown in FIG. 10b, and a newly added block b3" shown in FIG. 10C.

In this case, since the block b3' in the document data set d' shown in FIG. 10B is assigned the label indicating that the block is non-confidential, the block b3' is not directly involved in the determination as to whether or not the whole of the document data set d is confidential. On the other hand, the block b3 in the document data set d' shown in FIG. 10A and the newly added block b3" shown in FIG. 10C are involved in the determination. In other words, a determination result as to whether or not the whole of the document data set d is confidential depends on a determination result as to whether or not each of the block b3 in the document data set d' shown in FIG. 10A and the newly added block b3" shown in FIG. 10C is confidential. For this reason, the blocks b3 and b3" are blocks (the hatched parts) whose degrees of confidentiality are to be determined.

Figure 11:
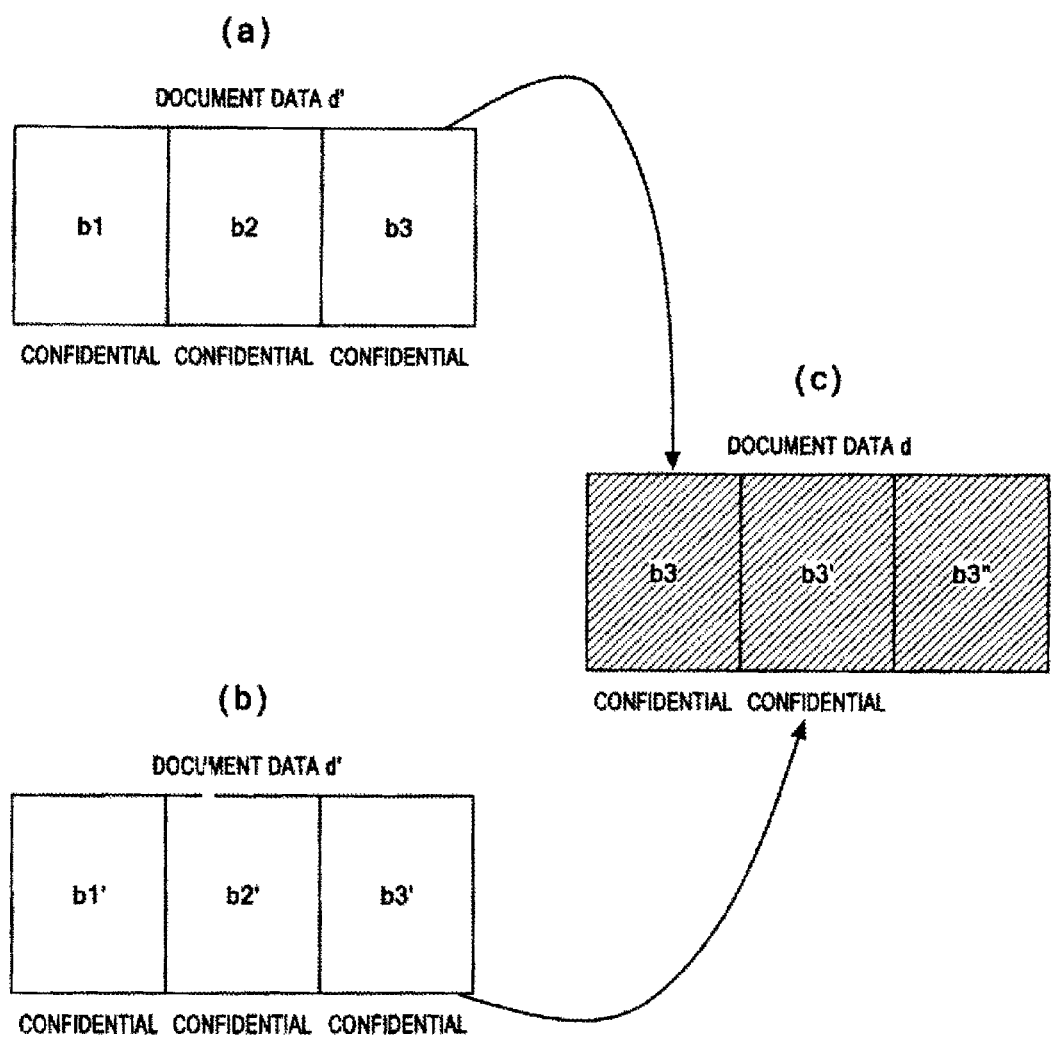
FIGS. 11A to 11C show a second example of the confidentiality determination processing in step S905.

Next, FIGS. 11A to 11C show a second example of the confidentiality determination processing in step S905. FIGS. 11A and 11B each show the document data set d' extracted from the document data storage unit 131, whereas FIG. 11C shows the document data set d acquired as a target for the confidentiality determination.

In FIGS. 11A to 11C, all the blocks in the document data sets d' in FIGS. 11A and 11B are assigned the label indicating that the block is confidential, and the document data set d in FIG. 11C consists of the block b3 of the document data set d' shown in FIG. 11A, the block b3' of the document data set d' shown in FIG. 11b, and a newly added block b3" shown in FIG. 11C.

In this case, a determination result as to whether or not the whole of the document data set d is confidential depends on a determination result as to whether or not each of the block b3 in the document data set d' shown in FIG. 11A, the block b3' in the document data set d' shown in FIG. 11B, and the newly added block b3" shown in FIG. 11C is confidential. For this reason, all the blocks b3, b3' and b3" are blocks (the hatched parts) whose degrees of confidentiality are to be determined.

Figure 12:
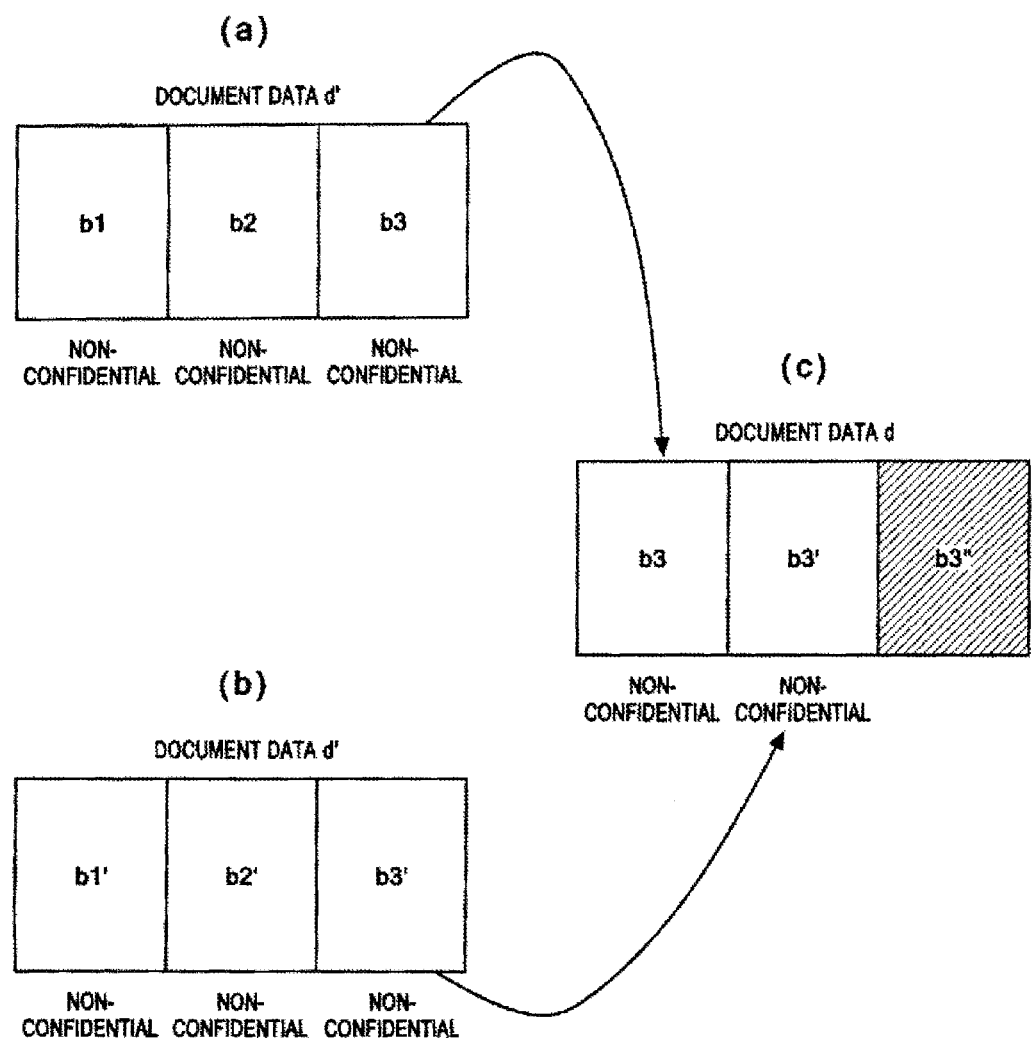
FIGS. 12A to 12C show a third example of the confidentiality determination processing in step S905.

FIGS. 12A to 12C show a third example of the confidentiality determination processing in step S905. FIGS. 12A and 12B show the document data sets d' extracted from the document data storage unit 131, whereas FIG. 12C shows the document data set d acquired as a target for the confidentiality determination.

In FIGS. 12A to 12C, all the blocks in the document data sets d' in FIGS. 12A and 12B are assigned the label indicating that the block is non-confidential, and the document data set d in FIG. 12C consists of the block b3 of the document data set d' shown in FIG. 12A, the block b3' of the document data set d' shown in FIG. 12b, and a newly added block b3" shown in FIG. 12C.

In this case, since the blocks b3 and b3' in the document data sets d' shown in FIGS. 12A and 12B are assigned the label indicating that the block is non-confidential, the blocks b3 and b3' are not directly involved in the determination as to whether or not the whole of the document data set d is confidential. On the other hand, the newly added block b3" shown in FIG. 10C is involved in the determination. In other words, a determination result as to whether or not the whole of the document data set d is confidential depends on a determination result as to whether or not the newly added block b3" shown in FIG. 10C is confidential. For this reason, only the block b3" is a block (the hatched part) targeted for the confidentiality determination.

Turning back to FIG. 9, if the CPU 11 of the confidentiality determination supporting apparatus 1 judges that no document data set including a block similar to the block b is stored in the document data storage unit 131 (step S903: NO), the CPU 11 skips steps S904 and S905. If the CPU 11 judges that the block b is not assigned the label indicating that the block is non-confidential (step S904: NO), the CPU 11 skips step S905. Then, the CPU 11 receives an input of a determination result of the degree of confidentiality of the block b (step S906).

The CPU 11 judges whether or not the block b is the last block (step S907). If the CPU 11 judges that the block b is not the last block (step S907: NO), the CPU 11 extracts the next block and sets the next block as the block b targeted for similarity judgment (step S908). Then, returning the processing to step S903, the CPU 11 iteratively performs the foregoing processing. If the CPU 11 judges that the block b is the last block (step S907: YES), the CPU 11 terminates the processing.

As described above, according to Embodiment 1, a document data set stored to be sharable between multiple users is stored in such a manner that blocks of the document data set are each associated with confidentiality information indicating whether or not the block is confidential. A document data set is acquired as a target for confidentiality determination processing. On the basis of criteria such as whether there is stored a document data set including a block similar to each block of the acquired document data set, and whether the confidentiality information indicating that the block is confidential is assigned to the block in the acquired document data set corresponding to the similar block, a user is allowed to skip the confidentiality determination processing for a block which is obviously confidential, or for a block which is obviously non-confidential. In this way, whether or not each document data set is confidential can be determined based on the confidentiality information assigned to the blocks of the document data set, without requiring the user to determine the degrees of confidentiality of blocks that can be obviously determined as non-confidential and as confidential. Thus, the confidentiality determination processing does not need to be performed for all the blocks, and therefore the present embodiment achieves reduction in burden required for the confidentiality determination processing.

Embodiment 2

Figure 13:
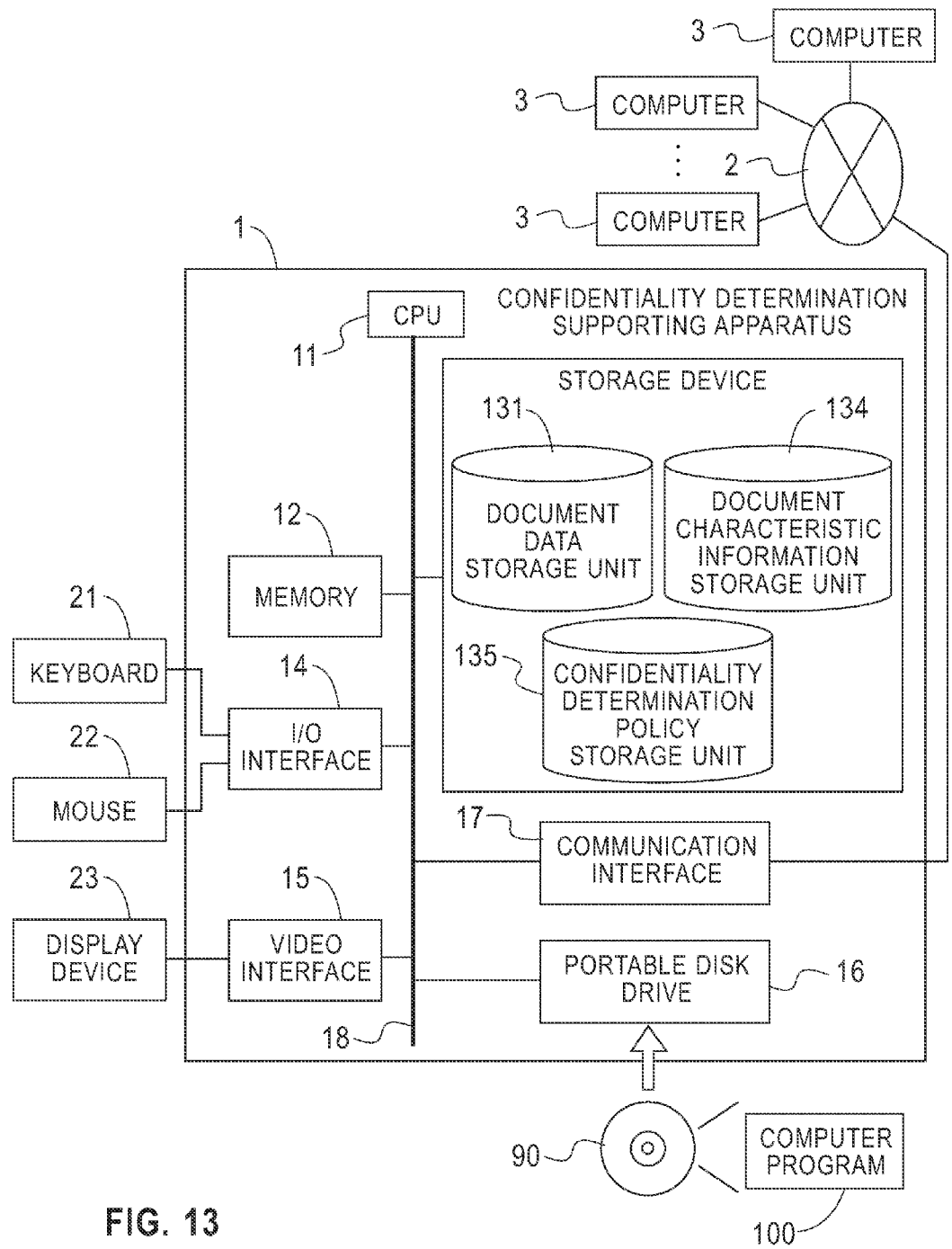
FIG. 13 is a block diagram showing a configuration example of a confidentiality determination supporting apparatus according to Embodiment 2 of the present invention.

FIG. 13 is a block diagram showing a configuration example of a confidentiality determination supporting apparatus according to Embodiment 2 of the present invention. The configuration of the confidentiality determination supporting apparatus according to Embodiment 2 of the present invention is similar to that in Embodiment 1. For this reason, common elements in Embodiment 2 are marked with the same reference numerals as in Embodiment 1, and detailed explanation thereof is omitted herein. Embodiment 2 is different from Embodiment 1 in that whether or not a document data set is confidential is determined according to whether the document data set targeted for the confidentiality determination includes a characteristic information difference between a confidential document data set and a non-confidential document data set from among stored document data sets having similar characteristic information.

The storage device 13 of the confidentiality determination supporting apparatus 1 includes a document data storage unit 131, a document characteristic information storage unit 134 and a confidentiality determination policy storage unit 135. The document data storage unit 131 stores a document data set targeted for determination as to whether the document data set is confidential or non-confidential. The document characteristic information storage unit 134 stores characteristic information indicating a characteristic of each document data set. The confidentiality determination policy storage unit 135 stores reference information for determining the degree of confidentiality of a document data set, for example, a confidentiality marker word or the like for determining the degree of confidentiality.

Here, "the characteristic information" indicates a wide concept including: a word representing the characteristic of the document data set in short; a hash value indicating the sameness of document data sets; security label information explicitly designated by the user; and the confidentiality marker word stored in the confidentiality determination policy storage unit 135; and the like. The characteristic information may be stored in units of document data sets, or in units of partial document structures, such as sections or paragraphs, for example. Then, "the security label information" indicates overall security information on whether a document data set or a block in the document data set is confidential or non-confidential.

Here, it should be noted that the document data storage unit 131, the document characteristic information storage unit 134 and the confidentiality determination policy storage unit 135 are sharable between predetermined users within the network 2, and allow the external computers 3, 3, . . . , to execute read processing, update processing and other processing thereon.

Figure 14:
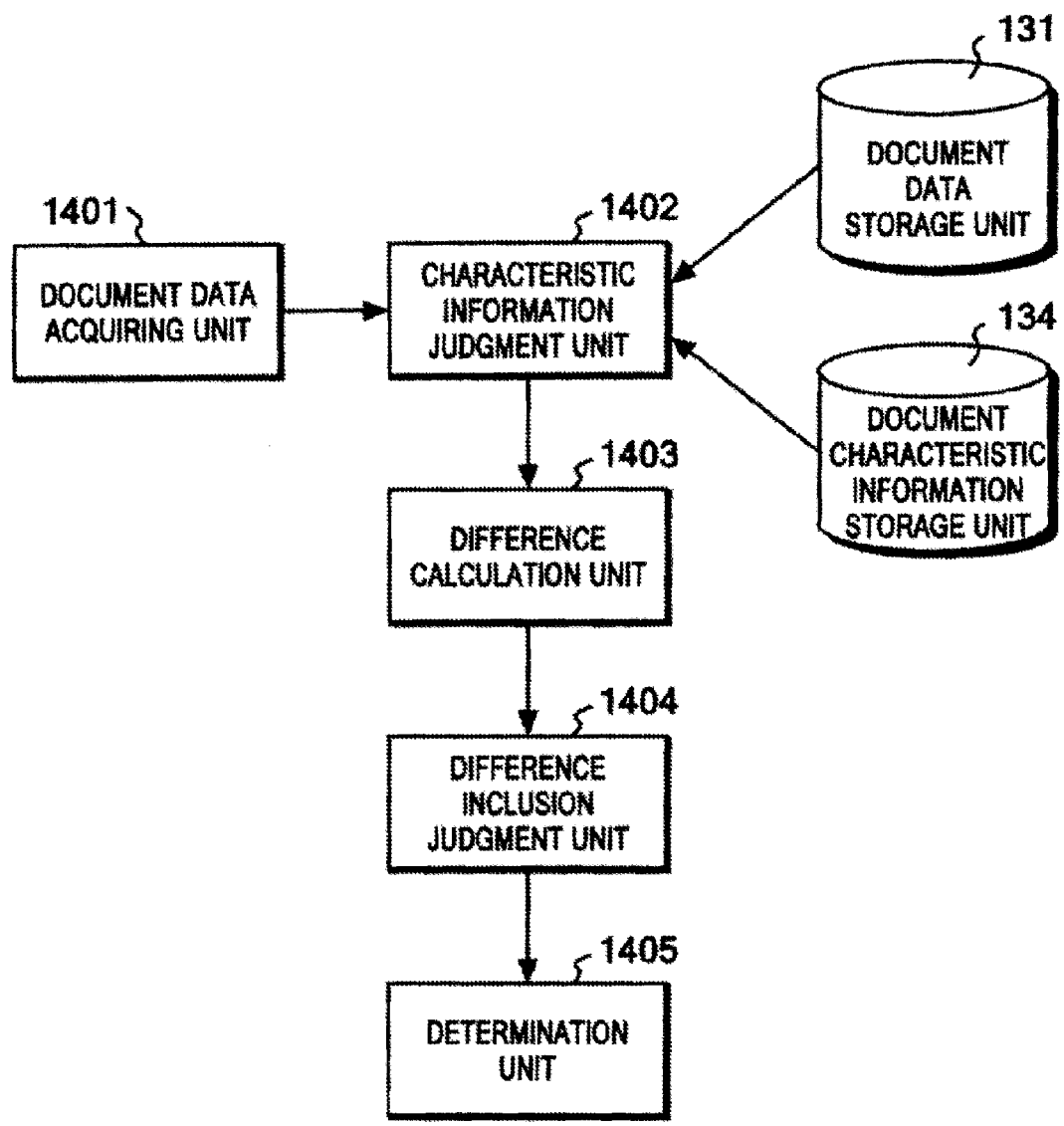
FIG. 14 is a functional block diagram of the confidentiality determination supporting apparatus according to Embodiment 2 of the present invention.

FIG. 14 is a functional block diagram of the confidentiality determination supporting apparatus 1 according to Embodiment 2 of the present invention. A document data acquiring unit 1401 acquires a document data set targeted for the confidentiality determination. A way to acquire the document data set is not limited to a particular one. For example, the document data acquiring unit 201 may acquire the document data set from any of the external computers 3, 3, . . . , through the network 2, or may acquire the document data set through the portable recording medium 90.

A characteristic information judgment unit 1402 reads a document data set stored in the document data storage unit 131, and judges whether or not the document characteristic information storage unit 134 stores the characteristic information similar to the characteristic information stored in association with the read document data set in the document characteristic information storage unit 134. In this way, the characteristic information judgment unit 1402 can judge whether or not a document data set having similar characteristic information is stored in the document data storage unit 131.

A different similarity judgment method for the characteristic information of a document data set is used depending on a type of the characteristic information included in the document data set targeted for the confidentiality determination. For example, in the case where the characteristic information is a word representing the characteristic of a document data set in short, each document data set can be analyzed to find the frequency of appearance of a particular word of the characteristic information, and then the degree of similarity between document data sets can be determined by comparing the frequencies of appearance of the particular word. For other types of characteristic information, a vector space model disclosed in Michael W. Berry and Murray Browne "Understanding Search Engines: Mathematical Modeling and Text Retrieval," Society for Industrial Mathematics, for example, may be applied and the degree of similarity may be determined depending on the length of a vector distance between two pieces of characteristic information.

If the characteristic information judgment unit 1402 judges that the characteristic information similar to the characteristic information of the read document data set is stored, i.e., document data sets having the similar characteristic information are stored, a difference calculation unit 1403 calculates a characteristic information difference between a confidential document data set and a non-confidential document data set from among the document data sets having the similar characteristic information determined as being stored.

A difference inclusion judgment unit 1404 judges whether the calculated characteristic information difference is included in the acquired document data set. If the difference inclusion judgment unit 1404 judges that the calculated characteristic information difference is included in the acquired document data set, a determination unit 1405 determines that the document data set is confidential. If not, the determination unit 1405 determines that the document data set is non-confidential.

Figure 15:
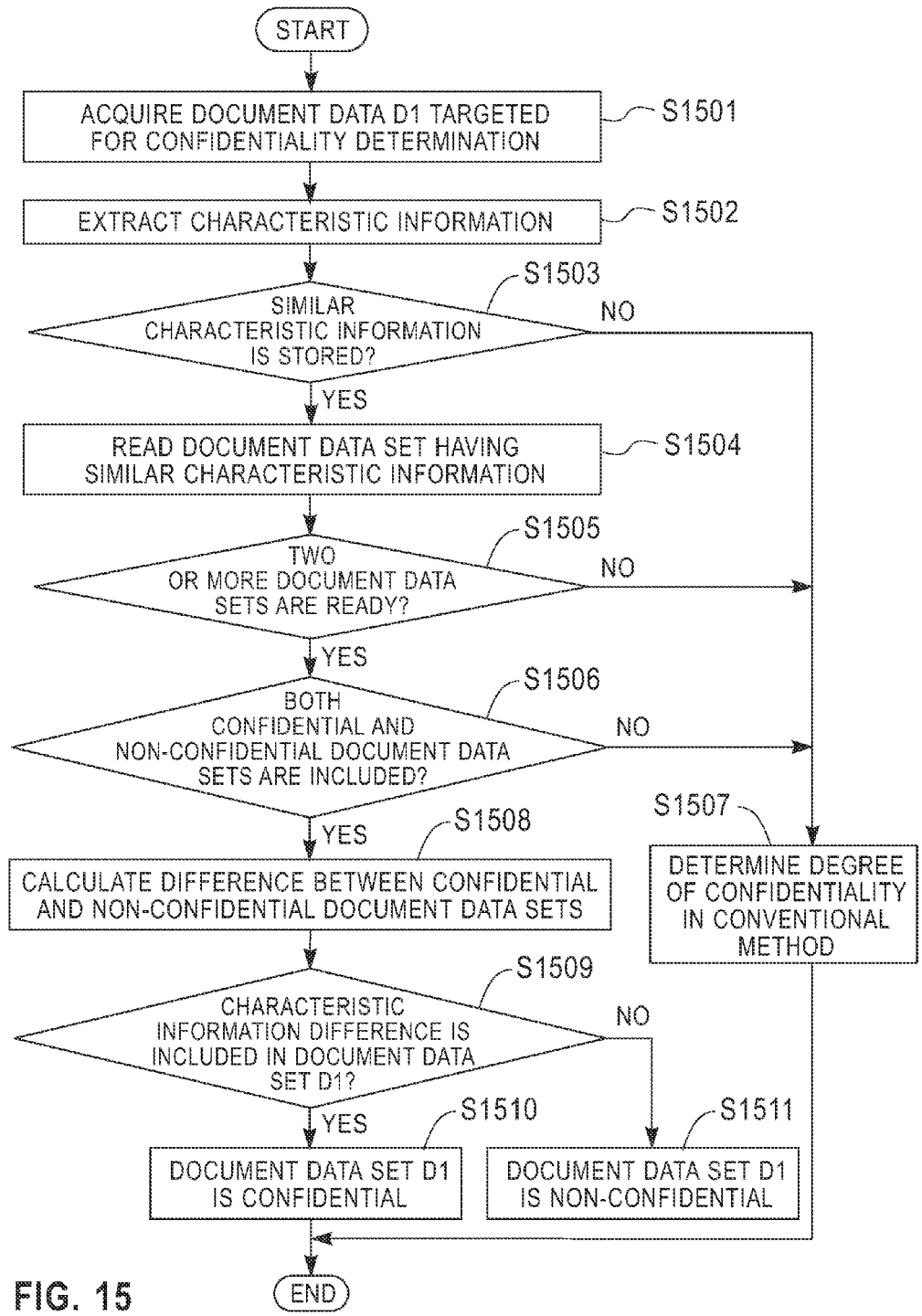
FIG. 15 is a flowchart showing processing procedures in which a CPU of the confidentiality determination supporting apparatus according to Embodiment 2 of the present invention determines the degree of confidentiality.

FIG. 15 is a flowchart showing processing procedures in which the CPU 11 of the confidentiality determination supporting apparatus 1 according to Embodiment 2 of the present invention determines the degree of confidentiality. As shown in FIG. 15, the CPU 11 of the confidentiality determination supporting apparatus 1 acquires a document data set D1 targeted for the confidentiality determination (step S1501). More specifically, the document data set d1 may be received from any of the external computers 3, 3, . . . , or may be read from document data sets stored in the storage device 13. Instead, the document data set d may be read through the portable recording medium 90.

The CPU 11 extracts the characteristic information stored in association with the acquired document data set D1 in the document characteristic information storage unit 134 (step S1502), and judges whether or not the document characteristic information storage unit 134 stores the characteristic information similar to the extracted characteristic information (step S1503). In this way, a determination can be made as to whether or not each document data set having the similar characteristic information is stored in the document data storage unit 131.

Otherwise, as a matter of course, only document data sets may be read from the document data storage unit 131, and characteristic information may be newly generated from the read document data sets. The usable characteristic information may be generated by analyzing the document data sets, and may be, for example, the frequency of appearance $c(x)$ of each word included in the document data sets, a hash value $h(x)$ for identifying that two of the document data sets are the same, or the like. Instead of them, various kinds of characteristic information can be used such as a degree of document confidentiality $p(x)$ determined depending on whether or not the document data set includes a confidentiality marker word or the like, and a security label $u(x)$ explicitly designated by the user. Note that, in the above functions expressing any types of the characteristic information, x denotes a document data set.

Moreover, a similarity judgment method for characteristic information of a document data set is used depending on a type of the characteristic information included in the document data set targeted for the confidentiality determination. For example, in the case where the characteristic information is a word representing the characteristic of the document data set in short, each document data set can be analyzed to find the frequency of appearance of a particular word of the characteristic information, and then the degree of similarity between document data sets can be determined by comparing the frequencies of appearance of the particular word. For other types of characteristic information, a vector space model disclosed in Michael W. Berry and Murray Browne "Understanding Search Engines: Mathematical Modeling and Text Retrieval," Society for Industrial Mathematics, for example, may be applied and the degree of similarity may be determined depending on the length of a vector distance between two pieces of characteristic information.

FIGS. 16A and 16B show an example of the characteristic information $c(x)$ when the frequency of appearance of each word is used as the characteristic information. FIG. 16A shows an example of acquired document data sets D1 and D2. The document data set D1 is a normal document data set, whereas the document data set D2 is a document data set obtained by excluding frequently appearing words (so-called stop words) such as articles, auxiliary verbs and adverbs from the document data set D1 and by generalizing words such as proper nouns, and data-and-time in the document data set D1 (generalize in this way is hereinafter referred to as "sanitize"). Here, the total sum of the times of appearance of each word may be calculated, and a word appearing a predetermined number of times or more may be excluded as a frequently appearing word.

FIG. 16B shows an example of characteristic information $c(x)$ of the document data sets D1 and D2. In the example in FIG. 16B, the frequency of appearance of each word is used as the characteristic information. The total sum of the times of appearance of each word is calculated for each of the document data sets D1 and D2.

Turning back to FIG. 15, if the CPU 11 of the confidentiality determination supporting apparatus 1 judges that the characteristic information similar to the extracted characteristic information is not stored (step S1503: NO), the CPU 11 determines the degree of confidentiality in the conventional method (step S1507). More specifically, whether or not the acquired document data set D1 is confidential is determined on the basis of similarity judgment or the like between the acquired document data set D1 and the stored document data sets, irrespective of a result of a characteristic information similarity judgment between these document data sets.

If the CPU 11 judges that the characteristic information similar to the extracted characteristic information is stored (step S1503: YES), the CPU 11 reads the document data set having the stored characteristic information (step S1504). The CPU 11 judges whether the number of the read document data sets is one or more (step S1505).

If the CPU 11 judges that the number of the read document data sets is one (step S1505: NO), the CPU 11 determines the degree of confidentiality in the conventional method (step S1507). More specifically, the acquired document data set D1 is determined as confidential if the read document data set is confidential, or the acquired document data set D1 is determined as non-confidential if the read document data set is non-confidential.

If the CPU 11 judges that the number of read document data sets is two or more (step S1505: YES), the CPU 11 judges whether or not the read document data sets include at least one confidential document data set and at least one non-confidential document data set (step S1506). If the CPU 11 judges that the read document data sets include only confidential document data sets or only non-confidential document data sets (step S1506: NO), the CPU 11 determines the degree of confidentiality in the conventional method (step S1507). More specifically, the acquired document data set D1 is determined as confidential if the read document data sets include only confidential document data sets, or the acquired document data set D1 is determined as non-confidential if the read document data sets include only non-confidential document data sets If the CPU 11 judges that the read document data sets include at least one confidential document data set and at least one non-confidential document data set (step S1506: YES), the CPU 11 calculates the characteristic information difference between the confidential document data set and the non-confidential document data set (step S1508). The characteristic information difference is calculated for each of all the pairs of the confidential document data sets and the non-confidential document data sets included in the multiple read document data sets.

FIG. 17 shows an example of a calculation result of a difference in the characteristic information c(x) based on the example in FIG. 16. In FIG. 17, the difference between the characteristic information c(D1) of the document data set D1 and the characteristic information c(D2) of the document data set D2 is calculated. The characteristic information difference c(D1)-c(D2) is calculated by extracting words included in the characteristic information c(D1) but not included in the characteristic information c(D2) without taking the frequency of appearance into account.

Turning back to FIG. 15, the CPU 11 of the confidentiality determination supporting apparatus 1 judges whether or not the calculated characteristic information difference is included in the acquired document data set D1 (step S1509). If the CPU 11 judges that the calculated characteristic information difference is not included in the acquired document data set D1 (step S1509: NO), the CPU 11 determines that the acquired document data set D1 is non-confidential (step S1511). If the CPU 11 judges that the calculated characteristic information difference is included in the acquired document data set D1 (step S1509: YES), the CPU 11 determines that the acquired document data set D1 is confidential (step S1510).

The foregoing processing will be described in detail below by taking specific document data sets as an example. FIGS. 18A to 18C show examples of document data sets Dp, Dq, and Dr stored in advance in the document data storage unit 131. FIG. 18A shows an example of the document data set Dp that is stored as confidential data. FIGS. 18B and 18C show examples of the document data sets Dq and Dr that are stored as non-confidential data.

The underlined parts in FIG. 18B indicate the differences between the document data set Dq and the document data set Dp. The underlined parts in FIG. 18C indicate the differences between the document data set Dr and the document data set Dp.

Firstly, a document data set D targeted for the confidentiality determination is acquired, and then a judgment is made as to whether or not the document characteristic information storage unit 134 stores the characteristic information similar to the characteristic information extracted from the acquired document data set D. FIGS. 19A and 19B show examples of the document data set D.

FIG. 19A shows an example of the document data set D thus acquired. In order to make a characteristic information similarity judgment, a document data set D' is generated by excluding frequently appearing words (so-called stop words) such as articles, auxiliary verbs and adverbs included in the document data set D. Then, the similarity judgment is made based on the document data set D' thus generated. FIG. 19B shows an example of the document data set D'.

FIGS. 20A to 20C show examples of document data sets being extracted based on the document data set D' and having similar characteristic information. Here, for simplification of the explanation, it is assumed that the document data sets in FIGS. 20A to 20C are extracted from the document data sets Dp, Dq, and Dr shown in FIG. 18A to 18C, respectively.

FIG. 20A shows a document data set Dp' in which frequently appearing words (so-called stop words) such as articles, auxiliaries verb and adverbs included in the document data set Dp are excluded; FIG. 20B shows a document data set Dq' in which frequently appearing words (so-called stop words) such as articles, auxiliaries verb and adverbs included in the document data set Dq are excluded; and FIG. 20C shows a document data set Dr' in which frequently appearing words (so-called stop words) such as articles, auxiliaries verb and adverbs included in the document data set Dr are excluded. The characteristic information difference is calculated based on the document data sets Dp', Dq' and Dr' thus sanitized.

FIG. 21 is a table showing a calculation result of the characteristic information c(x) of the document data sets D', Dp', Dq' and Dr'. In FIG. 21, the frequency of appearance of each word is used as the characteristic information, and the total sum of the times of appearance of each word is calculated for each of the document data sets D', Dp', Dq' and Dr'.

In this example, the document data set D' is non-confidential because the information such as a product name and data-and-time is sanitized as "XXXXX" from the beginning. When only the degrees of similarity are simply calculated, the calculated degree of similarity between the document data set D' and the document data set Dp' has a larger value than the degree of similarity between the document data set D' and the document data set Dq' or the document data set Dr'. However, the degree of confidentiality of each document data set cannot be correctly judged, unless being judged based on whether or not the document data set includes the characteristic information considered important for the confidentiality determination. For this reason, a union P of the characteristic information c(Dp') of the document data set Dp' and the characteristic information c(Dr') of the document data set Dr' is calculated as c(Dp')∪c(Dr'), and a difference between the union P and the characteristic information c(Dq') of the document data set Dq' is calculated.

FIG. 22 is a table showing a calculation result of the difference between the union P and the characteristic information c(Dq') of the document data set Dq'. As shown in FIG. 22, the difference includes "Hogehoge," "September" and "2008" that are information, such as the product name and data-and-time, including sanitized confidential information.

From this, it is apparent that the characteristic information considered important for the confidentiality determination is "Hogehoge," "September" and "2008" that are included in the difference.

The words of "Hogehoge," "September" and "2008" included in the difference are not included in the document data set D. Accordingly, the document data set D can be judged as not having any confidential information included in the document data set Dp, and therefore can be judged as non-confidential. If the information, such as the product name and data-and-time, including sanitized confidential information is not sanitized in the document data set D, the document data set D can be judged as having the confidential information included in the document data set Dp, and thus can be judged as confidential.

As described above, according to Embodiment 2, the characteristic information difference between a confidential document data set and a non-confidential document data set from among the document data sets judged as similar to each other is calculated. In this way, a part of a document data set considered important for the confidential information can be estimated with high accuracy. Then, by judging whether or not the calculated characteristic information difference is included in the document data set, the degree of confidentiality of the document data set can be determined with high accuracy.

It should be noted that the present invention is not limited to the foregoing embodiments, and can be changed or modified in various manners without departing from the split of the present invention. For example, the document data storage unit 131 and the confidentiality information storage unit 132 may be integrated into a single unit. Then, a document data set may be divided into multiple blocks when being stored, and labels indicating the confidentiality information may be stored for the respective blocks in that single unit. Alternatively, the document data storage unit 131, the document characteristic information storage unit 134, and the confidentiality determination policy storage unit 135 may be integrated so as to store the above information all together.

Moreover, when document data sets including an acquired document data set include both a confidential document data set and a non-confidential document data set, the method described in Embodiment 2 can be applied to a method for calculating a difference between blocks. In this way, whether or not the whole of the document data set is confidential can be also judged. For example, let's consider a case where there are a confidential document data set A1 composed of three pages; and a non-confidential document data set A2 composed of first and second pages similar to those in the document data set A1 and a third page not slimier thereto. In this case, only the third page of the document data set A1 that is the difference between the two document data sets can be regarded as having confidential information. Thus, a document data set A3 including only the third page of the document data set A1 can be determined as confidential, and a document data set A4 including the first page of the document data set A1 can be determined as non-confidential.

According to the present invention, a block which can be obviously determined as confidential, or a block which can be obviously determined as non-confidential are excluded from targets for the confidentiality determination processing. Then, whether or not each document data set is confidential can be determined based on the confidentiality information assigned to the blocks of the document data set. In this way, the confidentiality determination processing does not need to be performed for all the blocks, and therefore the present invention achieves reduction in load required for the confidentiality determination processing.

In addition, by calculating a difference between a document data set judged as confidential and a document data set judged as non-confidential, a part of a document data set considered important for the confidentiality information can be estimated with high accuracy. Thus, the degree of confidentiality of the document data set can be determined with high accuracy.

Although the preferred embodiments of the present invention have been described in detail, it should be understood that various changes, substitutions and alternations can be made therein without departing from spirit and scope of the inventions as defined by the appended claims.

What is claimed is:

1. A method executable in a computer for supporting a determination of a degree of confidentiality of a document data set, the method comprising the steps of:
    storing each block of a document data set in association with confidentiality information that indicates whether or not the block is confidential, the document data set being dividable into a plurality of blocks, each of the blocks being a unit including properties evaluated as having a certain characteristic;
    acquiring a document data set whose degree of confidentiality is to be determined;
    determining whether a document data set, including a block similar to each of blocks of the acquired document data set, is stored;
    in response to a determination that the document data set including the similar block is stored, determining whether the confidentiality information indicating that the block is confidential is assigned to the block in the acquired document data set corresponding to the similar block;
    in response to a determination that the confidentiality information indicating that the block is confidential has been assigned, determining that the acquired document data set is confidential;
    determining whether the confidentiality information is assigned to all the blocks;
    extracting document data subsets that are subsets of the acquired document data set if it is determined there is a block not assigned the confidentiality information;
    determining whether all the document data subsets of the acquired document data set are non-confidential; and
    assigning the confidentiality information assigned to the similar block if all the document data subsets of the acquired document data set are determined to be non-confidential.

2. The method according to claim 1, further comprising the steps of:
    determining whether all the document data subsets of the acquired document data set are confidential; and
    assigning the acquired document data set the confidentiality information indicating that the document data set is confidential if all the document data subsets of the acquired document data set are determined to be confidential and the degree of confidentiality was determined in units of document data sets.

3. The method according to claim 2, further comprising the step of:
    assigning the block in the acquired document data set the confidentiality information assigned to the similar block if all if all the document data subsets of the acquired document data set are determined to be confidential and the degree of confidentiality was determined in units of blocks.

4. The method according to claim 3, further comprising the steps of:
  extracting each document data set including the acquired document data set when the document data subsets of the acquired document data set include a non-confidential document data subset;
  determining whether all the document data sets each including the acquired document data set are non-confidential; and
  assigning the acquired document data set the confidentiality information indicating that the document data set is non-confidential if all the document data sets are determined to be non-confidential.

5. The method according to claim 4, further comprising the steps of:
  if all the document data sets including the acquired document data set are are determined to include a confidential document data set, determining whether the similar block is assigned confidentiality information indicating that the block is non-confidential; and
  receiving a determination result indicating which confidentiality information is to be assigned to the block if the similar block is determined not to have been assigned the confidentiality information indicating that the block is non-confidential.

6. An apparatus comprising:
  confidentiality information storage means for storing each block of a document data set in association with confidentiality information that indicates whether or not the block is confidential, the document data set being dividable into a plurality of blocks, the blocks each being a unit including properties evaluated as having a certain characteristic;
  document data acquiring means for acquiring a document data set whose degree of confidentiality is to be determined;
  similarity judgment means for judging whether there is stored a document data set including a block similar to each of blocks of the acquired document data set;
  assignment judgment means for judging whether the confidentiality information indicating that the block is confidential is assigned to the block in the acquired document data set corresponding to the similar block, when the similarity judgment means judges that the document data set including the similar block is stored;
  determination means for determining that the acquired document data set is confidential, under the condition that the assignment judgment means judges that the confidentiality information indicating that the block is confidential is assigned;
  determination means for determining whether the confidential information is assigned to all the blocks;
  extraction means for extracting document data subsets that are subsets of the acquired document data set if it is determined there is a block not assigned the confidentiality information;
  determination means for determining whether all the document data subsets of the acquired document data set are non-confidential; and
  assigning means for assigning the confidentiality information assigned to the similar block if all the document data subsets of the acquired document data set are determined to be non-confidential.

7. A non-transitory computer readable storage medium having tangibly stored thereon or therein a computer program executable in a computer for supporting a determination on a degree of confidentiality of a document data set, the computer program, when executed, causing the computer to perform the method comprising:
  storing each block of a document data set in association with confidentiality information that indicates whether or not the block is confidential, the document data set being dividable into a plurality of blocks, each of the blocks being a unit including properties evaluated as having a certain characteristic;
  acquiring a document data set whose degree of confidentiality is to be determined;
  determining whether a document data set, including a block similar to each of blocks of the acquired document data set, is stored;
  in response to a determination that the document data set including the similar block is stored, determining whether the confidentiality information indicating that the block is confidential is assigned to the block in the acquired document data set corresponding to the similar block;
  in response to a determination that the confidentiality information indicating that the block is confidential has been assigned, determining that the acquired document data set is confidential;
  determining whether the confidentiality information is assigned to all the blocks;
  extracting document data subsets that are subsets of the acquired document data set if it is determined there is a block not assigned that confidentiality information;
  determining whether all the document data subsets of the acquired document data set are non-confidential; and
  assigning the confidentiality information assigned to the similar block if all the document data subsets of the acquired document data set are determined to be non-confidential.

* * * * *